(12) United States Patent
O'Neill et al.

(10) Patent No.: US 11,336,948 B1
(45) Date of Patent: *May 17, 2022

(54) SYSTEM FOR PROVIDING MUSIC CONTENT TO A USER

(71) Applicant: Music Choice, Horsham, PA (US)

(72) Inventors: Donna M. O'Neill, Ambler, PA (US); Kevin Boone, Philadelphia, PA (US); David J. Del Beccaro, Jenkintown, PA (US)

(73) Assignee: Music Choice, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/010,288

(22) Filed: Sep. 2, 2020

Related U.S. Application Data

(63) Continuation of application No. 16/281,804, filed on Feb. 21, 2019, now Pat. No. 10,785,526, which is a
(Continued)

(51) Int. Cl.
*H04N 21/431* (2011.01)
*H04N 21/482* (2011.01)
(Continued)

(52) U.S. Cl.
CPC ......... *H04N 21/4312* (2013.01); *G11B 27/10* (2013.01); *H04N 21/4438* (2013.01);
(Continued)

(58) Field of Classification Search
CPC ........... H04N 21/4312; H04N 21/4438; H04N 21/47202; H04N 21/4825; H04N 21/8456; G11B 27/10
See application file for complete search history.

(56) References Cited

U.S. PATENT DOCUMENTS

| 4,127,796 A | 11/1978 | Henderson |
| RE29,997 E | 5/1979 | Den Toonder |

(Continued)

FOREIGN PATENT DOCUMENTS

| EP | 1022900 | 7/2000 |
| WO | 1997037492 | 10/1997 |

(Continued)

OTHER PUBLICATIONS

Amended Invalidity Contentions case No. 2:16-cv-586-JRG-RSP (Apr. 13, 2017), 613 pages.
(Continued)

*Primary Examiner* — Sumaiya A Chowdhury
(74) *Attorney, Agent, or Firm* — Rothwell, Figg, Ernst & Manbeck, P.C.

(57) ABSTRACT

A user may employ a user device (e.g., a television (TV) and a set-top box (STB)) to access a television system via a network. The television system may include one or more content servers (CSs) (e.g., a VOD server, an HTTP server, or other media server) for providing, among other things, a VOD service to the user and a broadcast transmission system for transmitting a multitude of linear television channels. Television system and/or user device is/are operable to enable the user to interact with an enhanced TV service (ETS) that allows the user to easily navigate among various different programmed linear channels (a.k.a., "streaming channels") and VOD services. The ETS may be hosted in the television system, in user device, or in a combination of the two.

14 Claims, 12 Drawing Sheets

Related U.S. Application Data continuation of application No. 15/677,236, filed on Aug. 15, 2017, now Pat. No. 10,219,027, which is a continuation of application No. 15/616,564, filed on Jun. 7, 2017, now abandoned, which is a continuation of application No. 14/922,597, filed on Oct. 26, 2015, now abandoned.

(60) Provisional application No. 62/068,374, filed on Oct. 24, 2014.

(51) Int. Cl.
    *H04N 21/443* (2011.01)
    *H04N 21/845* (2011.01)
    *H04N 21/472* (2011.01)
    *G11B 27/10* (2006.01)

(52) U.S. Cl.
    CPC ... H04N 21/47202 (2013.01); H04N 21/4825 (2013.01); H04N 21/8456 (2013.01)

(56) References Cited

U.S. PATENT DOCUMENTS

| | | |
|---|---|---|
| 4,336,478 A | 6/1982 | Quilty et al. |
| 4,338,623 A | 7/1982 | Asmus et al. |
| 4,360,805 A | 11/1982 | Andrews et al. |
| 4,677,430 A | 6/1987 | Falkman et al. |
| 4,722,005 A | 1/1988 | Ledenbach |
| 4,760,455 A | 7/1988 | Nagashima |
| 4,799,156 A | 1/1989 | Shavit et al. |
| 4,823,386 A | 4/1989 | Dumbauld |
| 5,027,400 A | 6/1991 | Reimer et al. |
| 5,130,615 A | 7/1992 | George |
| 5,193,006 A | 3/1993 | Yamazaki |
| 5,235,680 A | 8/1993 | Bijangte |
| 5,315,448 A | 5/1994 | Ryan |
| 5,341,350 A | 8/1994 | Frank et al. |
| 5,355,302 A | 10/1994 | Martin et al. |
| 5,365,381 A | 11/1994 | Scheffler |
| 5,371,551 A | 12/1994 | Logan et al. |
| 5,418,654 A | 5/1995 | Scheffler |
| 5,420,838 A | 5/1995 | Maeda et al. |
| 5,481,296 A | 1/1996 | Cragun et al. |
| 5,534,911 A | 7/1996 | Levitan |
| 5,550,863 A | 8/1996 | Yurt et al. |
| 5,557,541 A | 9/1996 | Schulhof et al. |
| 5,559,949 A | 9/1996 | Reimer |
| 5,561,709 A | 10/1996 | Reimer et al. |
| 5,572,442 A | 11/1996 | Schulhof et al. |
| 5,585,866 A | 12/1996 | Miller et al. |
| 5,590,282 A | 12/1996 | Clynes |
| 5,592,511 A | 1/1997 | Schoen et al. |
| 5,596,373 A | 1/1997 | White et al. |
| 5,616,876 A | 4/1997 | Cluts |
| 5,617,565 A | 4/1997 | Augenbraun et al. |
| 5,629,867 A | 5/1997 | Goldman |
| 5,635,989 A | 6/1997 | Rothmuller |
| 5,636,276 A | 6/1997 | Brugger |
| 5,646,992 A | 7/1997 | Subler |
| 5,675,734 A | 10/1997 | Hair |
| 5,708,780 A | 1/1998 | Levergood et al. |
| 5,721,815 A | 2/1998 | Ottesen et al. |
| 5,726,909 A | 3/1998 | Krikorian |
| 5,734,719 A | 3/1998 | Tsevdos et al. |
| 5,734,853 A | 3/1998 | Hendricks et al. |
| 5,734,961 A | 3/1998 | Castille |
| 5,751,282 A | 5/1998 | Girard et al. |
| 5,751,806 A | 5/1998 | Ryan |
| 5,752,160 A | 5/1998 | Dunn |
| 5,753,844 A | 5/1998 | Matsumoto |
| 5,754,939 A | 5/1998 | Herz et al. |
| 5,761,606 A | 6/1998 | Wolzien |
| 5,761,607 A | 6/1998 | Gudesen |
| 5,761,662 A | 6/1998 | Dasan |
| 5,771,435 A | 6/1998 | Brown |
| 5,777,997 A | 7/1998 | Kahn |
| 5,781,889 A | 7/1998 | Martin et al. |
| 5,784,095 A | 7/1998 | Robbins et al. |
| 5,787,090 A | 7/1998 | Van Niekerk et al. |
| 5,790,935 A | 8/1998 | Payton |
| 5,793,980 A | 8/1998 | Glaser et al. |
| 5,808,223 A | 9/1998 | Kurakake et al. |
| 5,809,144 A | 9/1998 | Sirbu et al. |
| 5,809,246 A | 9/1998 | Goldman |
| 5,815,634 A | 9/1998 | Reimer et al. |
| 5,818,935 A | 10/1998 | Maa |
| 5,819,049 A | 10/1998 | Reietmann |
| 5,819,160 A | 10/1998 | Foladare et al. |
| 5,835,487 A | 11/1998 | Campanella |
| 5,841,979 A | 11/1998 | Schulhof et al. |
| 5,848,398 A | 12/1998 | Martin et al. |
| 5,861,906 A | 1/1999 | Dunn et al. |
| 5,878,141 A | 3/1999 | Daly et al. |
| 5,890,137 A | 3/1999 | Koreeda |
| 5,890,139 A | 3/1999 | Suzuki et al. |
| 5,899,699 A | 5/1999 | Kamiya |
| 5,899,980 A | 5/1999 | Wilf et al. |
| 5,900,830 A | 5/1999 | Scheffler |
| 5,905,865 A | 5/1999 | Palmer et al. |
| 5,913,204 A | 6/1999 | Kelly |
| 5,918,012 A | 6/1999 | Astiz et al. |
| 5,918,213 A | 6/1999 | Bernard et al. |
| 5,926,624 A | 7/1999 | Katz et al. |
| 5,930,765 A | 7/1999 | Martin et al. |
| 5,930,768 A | 7/1999 | Hooban |
| 5,931,901 A | 8/1999 | Wolfe et al. |
| 5,933,500 A | 8/1999 | Blatter et al. |
| 5,943,422 A | 8/1999 | Van Wie et al. |
| 5,944,608 A | 8/1999 | Reed et al. |
| 5,959,945 A | 9/1999 | Kleiman |
| 5,960,411 A | 9/1999 | Hartman et al. |
| 5,968,120 A | 10/1999 | Guedalia |
| 5,969,283 A | 10/1999 | Looney et al. |
| 5,970,474 A | 10/1999 | LeRoy et al. |
| 5,973,722 A | 10/1999 | Wakai et al. |
| 5,980,261 A | 11/1999 | Mino et al. |
| 5,986,692 A | 11/1999 | Logan et al. |
| 5,991,374 A | 11/1999 | Hazenfield |
| 5,991,737 A | 11/1999 | Chen |
| 6,011,761 A | 1/2000 | Inoue |
| 6,011,854 A | 1/2000 | Van Ryzin |
| 6,020,883 A | 2/2000 | Herz et al. |
| 6,021,432 A | 2/2000 | Sizer et al. |
| 6,025,868 A | 2/2000 | Russo |
| 6,038,591 A | 3/2000 | Wolfe et al. |
| 6,055,314 A | 4/2000 | Spies et al. |
| 6,055,560 A | 4/2000 | Mills et al. |
| 6,055,566 A | 4/2000 | Kikinis |
| 6,069,655 A | 5/2000 | Seeley et al. |
| 6,085,235 A | 7/2000 | Clarke et al. |
| 6,088,455 A | 7/2000 | Logan et al. |
| 6,088,722 A | 7/2000 | Herz et al. |
| 6,105,060 A | 8/2000 | Rothblatt |
| 6,111,882 A | 8/2000 | Yamamoto |
| 6,135,646 A | 10/2000 | Kahn et al. |
| 6,141,488 A | 10/2000 | Knudson et al. |
| 6,151,634 A | 11/2000 | Glaser et al. |
| 6,154,772 A | 11/2000 | Dunn et al. |
| 6,161,142 A | 12/2000 | Wolfe et al. |
| 6,175,840 B1 | 1/2001 | Chen et al. |
| 6,182,126 B1 | 1/2001 | Nathan et al. |
| 6,188,830 B1 | 2/2001 | Mercs et al. |
| 6,192,340 B1 | 2/2001 | Abecassis |
| 6,223,292 B1 | 4/2001 | Dean et al. |
| 6,226,030 B1 | 5/2001 | Harvey et al. |
| 6,226,618 B1 | 5/2001 | Downs et al. |
| 6,229,895 B1 | 5/2001 | Son et al. |
| 6,232,539 B1 | 5/2001 | Looney et al. |
| 6,233,389 B1 | 5/2001 | Barton et al. |
| 6,233,682 B1 | 5/2001 | Fritsch |
| 6,240,553 B1 | 5/2001 | Son et al. |
| 6,243,725 B1 | 6/2001 | Hempleman et al. |
| 6,246,672 B1 | 6/2001 | Lumelsky |

(56) References Cited

U.S. PATENT DOCUMENTS

| | | |
|---|---|---|
| 6,248,946 B1 | 6/2001 | Dwek |
| 6,249,810 B1 | 6/2001 | Kiraly |
| 6,253,235 B1 | 6/2001 | Estes |
| 6,253,237 B1 | 6/2001 | Story et al. |
| 6,262,772 B1 | 7/2001 | Shen et al. |
| 6,263,505 B1 | 7/2001 | Walker et al. |
| 6,271,455 B1 | 8/2001 | Ishigaki et al. |
| 6,279,040 B1 | 8/2001 | Ma et al. |
| 6,286,139 B1 | 9/2001 | Decinque |
| 6,289,165 B1 | 9/2001 | Abecassis |
| 6,305,020 B1 | 10/2001 | Horaty et al. |
| 6,317,784 B1 | 11/2001 | Mackintosh et al. |
| 6,324,217 B1 | 11/2001 | Gordon |
| 6,330,595 B1 | 12/2001 | Ullman et al. |
| 6,330,609 B1 | 12/2001 | Garofalakis et al. |
| 6,338,044 B1 | 1/2002 | Cook et al. |
| 6,341,375 B1 | 1/2002 | Watkins |
| 6,349,339 B1 | 2/2002 | Williams |
| 6,351,469 B1 | 2/2002 | Otani et al. |
| 6,360,368 B1 | 3/2002 | Chawla |
| 6,366,791 B1 | 4/2002 | Lin et al. |
| 6,369,851 B1 | 4/2002 | Marflak et al. |
| 6,378,129 B1 | 4/2002 | Zetts |
| 6,385,596 B1 | 5/2002 | Wiser et al. |
| 6,389,467 B1 | 5/2002 | Eyal |
| 6,393,430 B1 | 5/2002 | Van Ryzin |
| 6,418,421 B1 | 7/2002 | Hurtado et al. |
| 6,434,621 B1 | 8/2002 | Pezzillo et al. |
| 6,434,747 B1 | 8/2002 | Khoo et al. |
| 6,445,306 B1 | 9/2002 | Trovato |
| 6,446,080 B1 | 9/2002 | Van Ryzin et al. |
| 6,446,130 B1 | 9/2002 | Grapes |
| 6,448,987 B1 | 9/2002 | Easty et al. |
| 6,452,609 B1 | 9/2002 | Katinsky et al. |
| 6,473,792 B1 | 10/2002 | Yavitz et al. |
| 6,481,012 B1 | 11/2002 | Gordon et al. |
| 6,490,728 B1 | 12/2002 | Kitazato et al. |
| 6,502,137 B1 | 12/2002 | Peterson et al. |
| 6,505,240 B1 | 1/2003 | Blumenau |
| 6,507,727 B1 | 1/2003 | Henrick |
| 6,526,411 B1 | 2/2003 | Ward |
| 6,550,011 B1 | 4/2003 | Sims, III |
| 6,580,870 B1 | 6/2003 | Kanazawa et al. |
| 6,587,127 B1 | 7/2003 | Leeke et al. |
| 6,587,837 B1 | 7/2003 | Spagna et al. |
| 6,597,891 B2 | 7/2003 | Tantawy et al. |
| 6,631,522 B1 | 10/2003 | Erdelyi |
| 6,637,032 B1 | 10/2003 | Reimer et al. |
| 6,694,090 B1 | 2/2004 | Lewis et al. |
| 6,704,491 B1 | 3/2004 | Revis |
| 6,748,427 B2 | 6/2004 | Drosset et al. |
| 6,766,357 B1 | 7/2004 | Fandozzi |
| 6,766,528 B1 | 7/2004 | Kim et al. |
| 6,782,550 B1 | 8/2004 | Cao |
| 6,785,707 B2 | 8/2004 | Teeple |
| 6,789,106 B2 | 9/2004 | Eyer |
| 6,792,280 B1 | 9/2004 | Hori et al. |
| 6,792,615 B1 | 9/2004 | Rowe et al. |
| 6,795,711 B1 | 9/2004 | Sivula |
| 6,796,555 B1 | 9/2004 | Blahut |
| 6,834,308 B1 | 12/2004 | Ikezoye et al. |
| 6,842,604 B1 | 1/2005 | Cook |
| 6,856,550 B2 | 2/2005 | Kato et al. |
| 6,865,550 B1 | 3/2005 | Cok |
| 6,868,440 B1 | 3/2005 | Gupta et al. |
| 6,880,132 B2 * | 4/2005 | Uemura .............. G06F 3/04815 715/848 |
| 6,898,800 B2 | 5/2005 | Son et al. |
| 6,915,529 B1 | 7/2005 | Suematsu et al. |
| 6,925,489 B1 | 8/2005 | Curtin |
| 6,928,655 B1 | 8/2005 | Omoigui |
| 6,933,433 B1 | 8/2005 | Porteus et al. |
| 6,952,221 B1 | 10/2005 | Holtz et al. |
| 6,965,770 B2 | 11/2005 | Walsh et al. |
| 6,978,310 B1 | 12/2005 | Rodriguez et al. |
| 6,985,694 B1 | 1/2006 | De Bonet |
| 7,020,888 B2 | 3/2006 | Reynolds et al. |
| 7,024,678 B2 | 4/2006 | Gordon et al. |
| 7,028,082 B1 | 4/2006 | Rosenberg et al. |
| 7,062,272 B2 | 6/2006 | Grilli et al. |
| 7,065,287 B1 | 6/2006 | Heredia et al. |
| 7,073,189 B2 | 7/2006 | McElhatten et al. |
| 7,076,561 B1 | 7/2006 | Rosenberg et al. |
| 7,111,099 B2 | 9/2006 | Alexander et al. |
| 7,133,924 B1 | 11/2006 | Rosenberg et al. |
| 7,140,032 B2 | 11/2006 | Dew et al. |
| 7,149,471 B1 | 12/2006 | Arisawa et al. |
| 7,155,674 B2 | 12/2006 | Breen et al. |
| 7,181,538 B2 | 2/2007 | Tam et al. |
| 7,207,006 B1 | 4/2007 | Feig et al. |
| 7,249,186 B1 | 7/2007 | Sitaraman et al. |
| 7,281,035 B2 | 10/2007 | Ihara et al. |
| 7,293,275 B1 | 11/2007 | Krieger et al. |
| 7,302,253 B2 | 11/2007 | Moody et al. |
| 7,305,698 B1 | 12/2007 | Tanigawa et al. |
| 7,320,025 B1 | 1/2008 | Steinberg et al. |
| 7,321,923 B1 | 1/2008 | Rosenberg et al. |
| 7,325,043 B1 | 1/2008 | Rosenberg et al. |
| 7,325,245 B1 | 1/2008 | Clapper |
| 7,343,179 B1 | 3/2008 | Theis et al. |
| 7,464,394 B1 | 12/2008 | Gordon et al. |
| 7,555,539 B1 | 6/2009 | Rosenberg et al. |
| 7,600,686 B2 | 10/2009 | Morris |
| 7,617,295 B1 | 11/2009 | Farber et al. |
| 7,668,538 B2 | 2/2010 | Rosenberg et al. |
| 7,711,838 B1 | 5/2010 | Boulter et al. |
| 7,735,106 B2 | 6/2010 | LaRocca et al. |
| 7,869,580 B2 | 1/2011 | Tagawa et al. |
| 7,870,592 B2 | 1/2011 | Hudson et al. |
| 7,962,572 B1 | 6/2011 | Farber et al. |
| 7,986,977 B2 | 7/2011 | Rosenberg et al. |
| 8,024,766 B2 | 9/2011 | Addington |
| 8,060,055 B2 | 11/2011 | Huang |
| 8,098,811 B2 | 1/2012 | Singh |
| 8,112,494 B2 | 2/2012 | Maghraby |
| 8,166,133 B1 | 4/2012 | Steinberg et al. |
| 8,170,194 B2 | 5/2012 | Shen et al. |
| 8,245,269 B2 | 8/2012 | Schiller |
| 8,260,271 B2 | 9/2012 | Rosenberg et al. |
| 8,265,237 B2 | 9/2012 | Reynolds et al. |
| 8,291,452 B1 | 10/2012 | Yong et al. |
| 8,381,252 B2 | 2/2013 | Young |
| 8,526,579 B2 | 9/2013 | Thomas |
| 8,533,175 B2 | 9/2013 | Roswell |
| 8,639,228 B2 | 1/2014 | Rosenberg et al. |
| 8,677,416 B2 | 3/2014 | Arora |
| 8,677,430 B2 | 3/2014 | Mitsuji et al. |
| 8,700,795 B2 | 4/2014 | Boulter et al. |
| 8,836,658 B1 * | 9/2014 | Jia .............. G06F 3/04815 345/173 |
| 8,868,481 B2 | 10/2014 | Wei et al. |
| 9,197,937 B1 | 11/2015 | Rosenberg |
| 9,351,045 B1 | 5/2016 | Steinberg et al. |
| 9,414,121 B1 | 8/2016 | Farber et al. |
| 10,390,092 B1 | 8/2019 | Farber |
| 10,390,093 B1 | 8/2019 | Rosenberg |
| 2001/0025259 A1 | 9/2001 | Rouchon |
| 2001/0032312 A1 | 10/2001 | Runje et al. |
| 2001/0042107 A1 | 11/2001 | Palm |
| 2001/0044851 A1 | 11/2001 | Rothman et al. |
| 2001/0049826 A1 | 12/2001 | Wilf |
| 2002/0002039 A1 | 1/2002 | Qureshey et al. |
| 2002/0021708 A1 | 2/2002 | Ishiai |
| 2002/0023163 A1 | 2/2002 | Frelechoux et al. |
| 2002/0023164 A1 | 2/2002 | Lahr |
| 2002/0023166 A1 | 2/2002 | Bar-Noy et al. |
| 2002/0032019 A1 | 3/2002 | Marks et al. |
| 2002/0032728 A1 | 3/2002 | Sako et al. |
| 2002/0038359 A1 | 3/2002 | Ihara et al. |
| 2002/0042913 A1 | 4/2002 | Ellis et al. |
| 2002/0046084 A1 | 4/2002 | Steele et al. |
| 2002/0056117 A1 | 5/2002 | Hasegawa et al. |
| 2002/0056118 A1 | 5/2002 | Hunter et al. |
| 2002/0058521 A1 | 5/2002 | Yamada et al. |

(56) References Cited

U.S. PATENT DOCUMENTS

| | | | |
|---|---|---|---|
| 2002/0059621 A1 | 5/2002 | Thomas et al. |
| 2002/0062261 A1 | 5/2002 | Mukai |
| 2002/0071658 A1 | 6/2002 | Marko et al. |
| 2002/0073425 A1 | 6/2002 | Arai et al. |
| 2002/0078456 A1 | 6/2002 | Hudson et al. |
| 2002/0083148 A1 | 6/2002 | Shaw et al. |
| 2002/0087402 A1 | 7/2002 | Zustak |
| 2002/0091762 A1 | 7/2002 | Sohn et al. |
| 2002/0108115 A1 | 8/2002 | Palmer |
| 2002/0124255 A1 | 9/2002 | Reichardt et al. |
| 2002/0138630 A1 | 9/2002 | Solomon et al. |
| 2002/0143782 A1 | 10/2002 | Headings et al. |
| 2002/0152278 A1 | 10/2002 | Pontenzone et al. |
| 2002/0161797 A1 | 10/2002 | Gallo et al. |
| 2002/0161909 A1 | 10/2002 | White |
| 2002/0174430 A1 | 11/2002 | Ellis et al. |
| 2002/0194260 A1 | 12/2002 | Headley et al. |
| 2002/0194607 A1 | 12/2002 | Connelly |
| 2002/0194619 A1 | 12/2002 | Chang et al. |
| 2003/0023975 A1 | 1/2003 | Schrader et al. |
| 2003/0028505 A1 | 2/2003 | O'Rourke et al. |
| 2003/0050058 A1 | 3/2003 | Walsh et al. |
| 2003/0050837 A1 | 3/2003 | Kim |
| 2003/0097338 A1 | 5/2003 | Mankovich et al. |
| 2003/0120500 A1 | 6/2003 | Deeds et al. |
| 2003/0126595 A1 | 7/2003 | Sie |
| 2003/0135464 A1 | 7/2003 | Mourad et al. |
| 2003/0153302 A1 | 8/2003 | Lewis et al. |
| 2003/0162571 A1 | 8/2003 | Chung |
| 2003/0182184 A1 | 9/2003 | Strasnick et al. |
| 2003/0188313 A1 | 10/2003 | Ellis et al. |
| 2003/0192060 A1 | 10/2003 | Levy |
| 2004/0255336 A1 | 12/2004 | Logan et al. |
| 2005/0060745 A1 | 3/2005 | Riedl et al. |
| 2005/0278761 A1 | 12/2005 | Gonder et al. |
| 2005/0289588 A1 | 12/2005 | Kinnear |
| 2006/0026639 A1 | 2/2006 | Potrebic et al. |
| 2006/0173974 A1 | 8/2006 | Tang |
| 2006/0194626 A1 | 8/2006 | Anttila |
| 2006/0199575 A1 | 9/2006 | Moore et al. |
| 2006/0235723 A1 | 10/2006 | Millard |
| 2007/0060112 A1 | 3/2007 | Reimer |
| 2007/0143493 A1* | 6/2007 | Mullig .................. G06F 16/40 709/232 |
| 2007/0168429 A1 | 7/2007 | Apfel et al. |
| 2008/0086742 A1 | 4/2008 | Aldrey et al. |
| 2008/0195970 A1* | 8/2008 | Rechsteiner ............ G06F 16/48 715/810 |
| 2009/0002335 A1 | 1/2009 | Chaudhri et al. |
| 2009/0028331 A1 | 1/2009 | Millar et al. |
| 2009/0178089 A1* | 7/2009 | Picco ................. H04N 7/17336 725/87 |
| 2009/0210905 A1 | 8/2009 | Maruyama et al. |
| 2009/0327894 A1 | 12/2009 | Rakib et al. |
| 2010/0119208 A1 | 5/2010 | Davis et al. |
| 2010/0229088 A1* | 9/2010 | Nakajima ............... G06F 16/68 715/702 |
| 2012/0096499 A1 | 4/2012 | Dasher et al. |
| 2012/0158524 A1 | 6/2012 | Hintz et al. |
| 2013/0332962 A1 | 12/2013 | Moritz et al. |
| 2014/0122593 A1 | 5/2014 | Bachman et al. |
| 2015/0193516 A1* | 7/2015 | Harb .................. G06Q 30/0251 707/625 |
| 2015/0312532 A1* | 10/2015 | Beaumier .......... H04N 21/4788 725/106 |

FOREIGN PATENT DOCUMENTS

| | | |
|---|---|---|
| WO | 1999010822 | 3/1999 |
| WO | 1999017230 | 4/1999 |
| WO | 1999039466 | 8/1999 |
| WO | 1999048296 | 9/1999 |
| WO | 2000007368 | 2/2000 |
| WO | 2000019662 | 4/2000 |
| WO | 2001036064 | 5/2001 |
| WO | 2001038993 | 5/2001 |
| WO | 2001079964 | 10/2001 |

OTHER PUBLICATIONS

Dougherty, Advertising Music Channel on Cable TV, The New York Times, Jun. 1981, 2 pages.
Yarrow, Cable TV Moves to the Music, The New York Times, Jul. 1982, 2 pages.
CFT2200 User Guide, General Instrument 1999, 63 pages.
Information Disclosure Statement, Dec. 2006, 3 pages.
DR500 User Guide for the DMX Digital Audio Satellite Receiver, DMX, Rev. C (Oct. 1994), 47 pages.
Michaels, F., WBEB Philly Extends Its Reach via Site, Billboard, 88 (Sep. 30, 2000) ("Billboard"), 2 pages.
Dely, L., WBEB Live Links Web and On-air Ads, RadioWorld.com (May 15, 2000) ("RadioWorld") (available at http://www.radioworld.com/news-and-business/0002/wbeb-live-links-web-and-onair-ads/304743), 7 pages.
Kerschbaumer, K., Philly FM creates novel Web future, BroadcastingCable.com (Jun. 4, 2000) ("Broadcasting Cable") (available at http://www.broadcastingcable.com/news/news-articles/philly-fm-creates-novel-web-future/86828), 6 pages.
Stingray Digital Group Answer to the Third Amended Complaint (Apr. 7, 2017), 230 pages.
AudioSense Corporation, Have you Seen Radio Lately, 6 pages.
RadioWave.com,Inc., "It's on-line . . . It's Interactive . . . It's the next wave of radio!" (1998), 2 pages.
RadioWave.com,Inc., "It's on-line . . . It's Interactive . . . It's the next wave of radio!," Install Disk (1998), 2 pages.
ClickZ, RadioWave.com and Enco Systems Establish Alliance, Oct. 19, 1998, 1 page.
Lyster, "Motorola Unit Fine-Tuning Internet Radio," Investor's Business Daily, Nov. 25, 1998, 1 page.
Hiber, "Internet Radio Ratings Coming Soon From Arbitron, RadioWave.com," Radio@Large (Dec. 1998), 1 page.
Gavin.com, "Today's Highlights," www.gavin.com/index.shtml (Dec. 25, 1998), 1 page.
Gavin.com, "Secure Digital Music Initiative Begins Portable Device Working Group," www.gavin.com/news/990305/sdmi.shtml (Mar. 5, 1999), 2 pages.
SEC Form S-1, Broadcast.com Inc. Part 1 (May 1998), 176 pages.
SEC Form S-1, Broadcast.com Inc. Part 2 (May 1998), 175 pages.
Prospectus, Broadcast.com (Jul. 16, 1998), 98 pages.
IPR2017-00888 Patent Owner Preliminary Response, (Jun. 2017), 48 pages.
IPR2017-00888 Institution Decision, (Sep. 2017), 24 pages.
IPR2017-00888 Patent Owner Response, (Jan. 2018), 83 pages.
IPR2017-00888 Ex. 2001 (1st Russ Declaration), (Jan. 2018), 55 pages.
IPR2017-00888 Ex. 2007 (2nd Russ Declaration), (Jan. 2018), 53 pages.
IPR2017-00888—Petitioner's Reply, (Apr. 16, 2018), 33 pages.
IPR2017-00888 Ex. 1009 Mar. 14, 2018 Deposition of Dr. Russ, 128 pages.
IPR2017-00888 Ex. 1010 Reply Declaration of Dr. Shamos, (Apr. 16, 2018), 43 pages.
IPR2017-00888 Ex. 1011 Excerpt from Websters, (1999), 4 pages.
IPR2017-00888 Ex. 1012 Excerpt from the Oxford English Dictionary (2d Ed.), (1989), 3 pages.
IPR2017-01191 Patent Owner Preliminary Response, (Jul. 2017), 42 pages.
IPR2017-01191 Institution Decision, (Oct. 2017), 25 pages.
IPR2017-01191 Patent Owner Response, (Jan. 2018), 68 pages.
IPR2017-01191 Ex. 2109 (1st Russ Declaration), (Jan. 2018), 27 pages.
IPR2017-01191 Ex. 2112 (2nd Russ Declaration), (Jan. 2018), 52 pages.
IPR2017-01191—Petitioner's Reply, (Apr. 16, 2018), 32 pages.
IPR2017-01191 Ex. 1020 Mar. 14, 2018 Deposition of Dr. Russ, 93 pages.

(56) References Cited

OTHER PUBLICATIONS

IPR2017-01191 Ex. 1021 Reply Declaration of Dr. Shamos, (Apr. 16, 2018), 34 pages.
IPR2017-01450 Patent Owner Preliminary Response, (Aug. 28, 2017), 37 pages.
IPR2017-01450 Ex. 2001 Claim Construction Order, (Jul. 6, 2017), 52 pages.
IPR2017-01450 Institution Decision, (Oct. 27, 2017), 35 pages.
IPR2017-01450 Patent Owner Response, (Mar. 5, 2018), 39 pages.
IPR2017-01450 Ex. 2002 Declaration of Dr. Russ, (Mar. 5, 2018), 40 pages.
IPR2017-01450 Ex. 2003 Shamos Deposition Transcript, (Feb. 14, 2018), 65 pages.
IPR2017-01450 Ex. 2004 Shamos Deposition Transcript, (Feb. 13, 2018), 141 pages.
IPR2017-01450 Ex. 2005 Illustrated Dictionary of Electronics, (1999), 6 pages.
IPR2017-01450 Ex. 2006 the Educational Technology Telecommunications Dictionary, (1991), 3 pages.
IPR2017-01450 Ex. 2007 Comprehensive Dictionary of Electrical Engineering, (1999), 5 pages.
IPR2017-01450 Ex. 2008 Dictionary of Information Technology (Third Edition), (1989), 4 pages.
IPR2017-01450 Ex. 2009 Desktop Dictionary of Information Systems Technology, (1989), 6 pages.
IPR2017-01450 Ex. 2010.
Portions of the File history of U.S. Appl. No. 11/002,181 (138), (Dec. 2006-Aug. 2007), 61 pages.
Portions of the File history of U.S. Appl. No. 11/963,164 (162), (Dec. 2010-Dec. 2011), 48 pages.
Portions of the File history of U.S. Appl. No. 13/453,826 (190), (Sep. 2013), 11 pages.
Portions of the File history of U.S. Appl. No. 14/153,872, (Sep. 2015-Dec. 2015), 20 pages.
Portions of the File history of U.S. Appl. No. 14/635,483, (U.S. Pat. No. 9,351,045), (Aug. 2015-Jan. 2016), 20 pages.
Portions of the File history of U.S. Appl. No. 15/162,259, (Sep. 2016), 6 pages.
Portions of the File history of U.S. Appl. No. 11/002,205, (U.S. Pat. No. 7,617,295), (136), (May 2008-Jun. 2009), 56 pages.
Portions of the File history of U.S. Appl. No. 12/605,580, (U.S. Pat. No. 7,962,572), (168), (Aug. 2010-Feb. 2011), 17 pages.
Portions of the File history of U.S. Appl. No. 13/157,386, (Oct. 2013), 15 pages.
Portions of the File history of U.S. Appl. No. 14/163,554, (U.S. Pat. No. 9,414,121), (Jul. 2014-Jun. 2016), 72 pages.
Portions of the File history of U.S. Appl. No. 15/231,152, (Jul. 2017), 35 pages.
Portions of the File history of U.S. Appl. No. 15/670,613, (Aug. 2017-Dec. 2017), 42 pages.
Final Office Action issued in U.S. Appl. No. 15/231,152 dated May 15, 2018, 19 pages.
IPR2017-01450—Petitioner's Reply, (May 18, 2018), 29 pages.
IPR2017-01450 Ex. 1016 Reply Declaration of Dr. Shamos, (May 18, 2018), 26 pages.
IPR2017-01450 Ex. 1017 U.S. Pat. No. 7,783,722, (Aug. 24, 2010), 49 pages.
IPR2017-01450 Ex. 1018 U.S. Pat. No. 7,275,256, (Sep. 25, 2007), 34 pages.
IPR2017-01450 Ex. 1019 Deposition Transcript of Dr. Russ, (Apr. 20, 2018), 89 pages.
IPR2017-01450 Ex. 1020 Definition of "Analog Data", https://www.techopedia.com/definition/24871/analog-data, Exhibit 3 to the Apr. 20, 2018 Deposition of Dr. Russ, 4 pages.
IPR2017-01450 Ex. 1021 Definition of "Analog Data", https://study.com/academy/lesson/analog-data-vs-digital-data.html, Exhibit 4 to the Apr. 20, 2018 Deposition of Dr. Russ, 3 pages.
IPR2017-01450 Ex. 1022 U.S. Patent Publication No. 2008/0101415, (May 1, 2008), 17 pages.
IPR2017-01450 Ex. 1023 U.S. Pat. No. 7,499,822, (Mar. 3, 2009), 38 pages.
IPR2017-01450 Ex. 1024 DirecTV vs. Cable, Wayback Archive of http://www.directv.com:80/Dtvapp/get_directv/directv_vs_cable.dsp, (Mar. 4, 2005), 2 pages.
IPR2017-01450 Ex. 1025 Patent Declaration Combined with Power of Attorney of U.S. Appl. No. 11/427,745, (2006), 4 pages.
IPR2017-01450 Ex. 1026 Definition of "phonograph", The American Heritage Desk Dictionary (2003 4th ed), 3 pages.
IPR2017-01450 Ex. 1027 Definition of "phonograph", Merriam-Webster's Collegiate Dictionary (2003 4th ed), 3 pages.
IPR2017-01450 Ex. 1028 "Stations Turn Off Analog Signals as Digital TV Deadline Arrives," New York Times, (Jun. 12, 2009), 16 pages.
IPR2017-01450 Ex. 1029 FCC Eleventh Annual Report, (Feb. 4, 2005), 151 pages.
Adolphe V. Bemotas, "Computers and TV: Marriage of the Future; Five Star Lift Edition", St. Louis Post—Dispatch, Oct. 11, 1995, 1 page.
John Sweeney, "An Introduction to Interactive Television", International Broadcasting Convention, 1994, pp. 503-508.
Pekowsky, S. and R. Jaeger the set-top box as 'multi-media terminal';—Consumer Electronics, IEEE Transactions on 1998, pp. 1-8.
AudioRequest, MP3 Home Stereo Jukebox, ReQuest, Inc.-Company Info., and NSI WHOIS Search Results. Pages from the web site for www.request.com owned by ReQuest, Inc., Jun. 22, 2004, 6 pages.
Clark D. (2000). "Click Radio to put a DJ in your PC." WSJ Interactive Edition.
ClickRadio granted first interactive radio license by universal music group. 3 pages. From the web site at www.clickradio.com, printed Apr. 26, 2000.
Gordon, C. (2000). "Click radio sidesteps competition with music licensing deals." Atnewyork.com.
Press Release. (Dec. 13, 2000). "Phillips showcases click radio on digital set-top at western show 2000." Phillips.
SonicNet: The Online Music Network, http:/web.archive.org/web/19991013143923/http://sonicnet.com/, Oct. 13, 1999, 6 pages.
Trowsdale, J., "The ntl guide to digital radio for dummies," http://www.ntl.com/locales/gb/en/guides/dummies/default.asp, Aug. 13, 2002, 1 page.
Bower (1998). "Digital Radio—A Revolution for In-Car Entertainment" Proc. NavPos Automative '98 Conf. 2(5-8): 40-51.
Deutsche Telekom AG, "Digital Radio," http://www.telekom.de/dtag/ipl1/cda/level3_a/0,3680,10077,00.html, Aug. 18, 2000, 1 page.
"The Eureka 147 Consortium," http://eurekadab.org/eureka_147_consortium.htm, Aug. 14, 2000, 3 pages.
Radio Authority (1999). Digital Radio Fact Sheet No. 4 http://www.radioauthority.org.uk/Information/Fact.sub.--Sheets/fs4.htm.
ICTV (2000). Digital Broadband System Press Release: 1-11.
Loeb, S., "Architecting Personalized Delivery of Multimedia Information", Communications of the ACM, Dec. 1992, vol. 35, No. 12, pp. 39-48.
"Blue Note Radio," Now Playing on a Computer Screen Near You. EMI's Blue Note Records Expands New Media Initiative with RadioWave.com, Press Release Newswire Association, Inc., Apr. 4, 2000, 2 pages.
"Global Media Announces Launch of Independent Internet Radio station," News Release, Feb. 1, 1999, 2 pages.
Olenick, Doug, "Internet Radio Listeners Unchained From Their PCs," Oct. 25, 1999. Twice Computer Technology, 1 page.
"Platinum Entertainment and Liquid Audio Join Forces to Offer Extensive Music Catalog via Digital Downloads", Press Release, Jul. 15, 1998, 2 pages.
"Set-top box for television that reads your mind," Financial Times Limited, Dec. 30, 1998, 1 page.
"Sonicbox and Microsoft Bring Windows Media Internet Radio to the Home Stereo," Dec. 7, 1999 Microsoft Press Release, 3 pages.
Partyka, Jeff , "Sonicbox brings Net radio into your living room," Oct. 12, 1999. CNN.com, 3 pages.
"Tune into Yahoo! Radio," Yahoo Media Relations Press Release, Yahoo! teams up with Broadcast.com and Spinner.com to Provide 10 stations of Audio Programming, May 11, 1999, 2 pages.

(56) References Cited

OTHER PUBLICATIONS

"WebRadio.com Signs on as Liquid Music Network Affiliate Offering Liquid Audio Digital Downloads," Business Wire, Inc., Sep. 1, 1999, 2 pages.
http://launch.yahoo.com, "Music on Yahoo", 2 pages, Jun. 25, 2004.
King, "Tune on, Tune in, Drop Cash" Dec. 8, 2000, Wired News, 4 pages.
LaFrance, "Thinking Globally with a web-based radio station vying for listeners around the world, homegrown internet company fastband aims to shake up the music world", Times Picayune, Nov. 4, 1999, 2 pages.
Rajapakshe, H. et al., "Video on Demand," Jun. 1995, pp. 1-15.
Time Warner Cable, Pegasus, "The ISA Tutorial," Version 1.0, Sep. 13, 2003, 73 pages.
UniView Technologies Now in Yahoo!'s Multicast Affiliate Program, Press Release Newswire Association, Inc., Oct. 19, 1999, 2 pages.
Welz, Gary, Integrated Streaming Technologies, Oct. 30, 1996, www.webdeveloper.cm/multimedi/multimedi.sub.--web/96/mw961030.html.
Yahoo Offers one-stop shop for e-music, Milwaulkee Journal Sentinel (Wisconsin), Aug. 25, 1999, 1 page.
Petition for Inter Parties Review U.S. Pat. No. 7,320,025, IPR Case No. IPR2017-00888, Mar. 17, 2013, 53 pages.
Declaration of Michael Shamos, Petition for Inter Parties Review U.S. Pat. No. 7,320,025, IPR Case No. IPR2017-00888, dated Mar. 7, 2017, 56 pages.
Hallier, J. et al., "Multimedia Broadcasting to mobile, portable and fixed Receivers using the Eureka 148 Digital Audio Broadcasting System," 5th IEEE International Symposium on Personal, Indoor and Mobile Radio Communications, Wireless Networks—Catching the Mobile Future, Sep. 18-23, 1994, 11 pages.
Petition for Inter Parties Review U.S. Pat. No. 9,351,045, IPR Case No. IPR2017-1191, dated Mar. 30, 2017, 62 pages.
Declaration of Michael Shamos, Petition for Inter Parties Review U.S. Pat. No. 9,351,045, IPR Case No. IPR2017-1191, dated Mar. 30, 2017, 135 pages.
Gonze, L., "A survey of playlist formats," Nov. 17, 2003, 12 pages.
Petition for Inter Parties Review U.S. Pat. No. 9,414,121, IPR Case No. IPR2017-1450, dated May 18, 2017, 79 pages.
Declaration of Michael Shamos, Petition for Inter Parties Review U.S. Pat. No. 9,414,121, IPR Case No. IPR2017-1450, dated May 18, 2017, 127 pages.
U.S. Appl. No. 60/377,963 (McElhatten—189 provisional application), filed May 3, 2002, 85 pages.
Music Choice's Local Patent Rule 3-1 Cover Pleading Submission in *Music Choice v. Stingray Digital Group Inc.*, Case No. 2:16-CV-0586-JRG-RSP (E.D. Tex.), dated Sep. 12, 2016, 5 pages.
Comaromi, J., et al. (Eds.)., "DDC 20: Dewey Decimal Classification," 20th Ed., 1989, 27 pages.
"LAUNCH Media and iBeam Team Up to Take on Heavyweight Napster on College Campus Circuit," digitalcoastdaily.com, Jun. 19, 2000, 10 pages.
Cosmas, J., et al., "CustomTV with MPEG-4 and MPEG-7," Institution of Electrical Enginners (1999), 7 pages.
Bryhni et al., "On-demand Regional Television Over the Internet," Nov. 1996, ACM Multimedia, Proceedings of the 4th ACM International Conference on Multimedia, 9 pages.
Bove et al., "Hyperlinked Television Research at the MIT Media Laboratory," May 2000, IBM Systems Journal, vol. 39, Nos. 3 & 4, 9 pages.
Cosmas et al., "CustomTV with MPEG-4 and MPEG-7," Dec. 6, 1999, IEE Electronics Communications: Interactive Television, Colloquium, 7 pages.
"Music Choice Europe, A Leader in Digital Music Services," Sep. 6, 2000, Investec Henderson Crosthwaite Securities, 47 pages.
"Music Choice Prospectus 2000," Sep. 2000, Investec Henderson Crosthwaite Securities, 95 pages.

"NDS to Showcase Interactive Applications that Transform Living Rooms into Digital Interactive Theaters at NAB 2000," Apr. 9, 2000, NDS Group plc. Business Wire, 3 pages.
Music Choice Europe, "Music Choice Chooses NDS as its Digital TV Technology Partner," Jul. 2000, 2 pages.
"NDS Delivers Sophisticated Interactive Application to Music Choice Europe," May 10, 2001, NDS Group plc. Business Wire, 3 pages.
"NDS Group plc Reports Full Year Revenues Up 35% and Operating Income Growth of 69% Plus Major Contract Wins in Fourth Quarter," Aug. 6, 2001, NDS Group plc, 15 pages.
NDS Website (http://web.archive.org/web/20000824140133/http://www.nds.com/products/broad_products/nds_broadcast/prod_value@tv.htm). Aug. 24, 2000, 7 pages.
Doherty et. al., "Detail-on-Demand Hypervideo," Nov. 2-8, 2003, FX Palo Alto Laboratory, 2 pages.
Krikke, "Streaming Video Transforms the Media Industry," Jul.-Aug. 2004, IEEE Computer Society, 7 pages.
Atzori et al., "Multimedia Information Broadcasting Using Digital TV Channels," Sep. 1997, IEEE Transactions on Broadcasting, vol. 43, No. 3, 10 pages.
Brunheroto et al., "Issues in Data Embedding and Synchronization for Digital Television", Jul. 30-Aug. 2, 2000, IEEE Publication, 6 pages.
Coden et al., "Speech Transcript Analysis for Automatic Search," Jan. 3-6, 2001, IEE Proceedings of the 34th Hawaii International Conference on System Science, 11 pages.
Dakss, Jonathan, "HyperActive: An Automated Tool for Creating Hyperlinked Video," Sep. 1999, Published thesis by the Massachusetts Institutes of Technology, 100 pages.
Jacobs, Bruce, "Transport B for Broadcasters: Boon or Bane?," Feb. 8-10, 2001, Twin Cities Public Television, Inc., 9 pages.
"Information Technology—Generic Coding of Moving Pictures and Associated Audio Information: Video," Feb. 2000, International Telecommunication Union (ITU-T), 220 pages.
Chang et al., "Overview of the MPEG-7 Standard," Jun. 2001, IEEE Transactions on Circuits and Systems for Video Technology, vol. 11, No. 6, 8 pages.
Yao et al., "The Development of a Video Metadata Authoring and Browsing System in XML," Dec. 2000, Australian Computer Society, Inc. Visualisation 2000, Pan-Sydney Workshop on Visual Information Processing, 8 pages.
Bainbridge et al., "Towards a Digital Library of Popular Music," Aug. 1, 1999, ACM, 9 pages.
Hacker, Scot, "MP3: the Definitive Guide," Mar. 2000, O'Reilly Publishing, 378 pages.
Jacso et al., "Music to Your Ears (and Eyes)," Jun.-Jul. 1996, Database; ABI/Inform Global, 10 pages.
Jermey, Jonathan , "Locating Files on Computer Disks," Apr. 2001, The Indexer, vol. 22, No. 3, 3 pages.
Lippman et al., "Media Banks: Entertainment and the Internet," Apr. 4, 1996, IBM Systems Journal, vol. 35, Nos. 3&4, 20 pages.
Loudeye Website, 1999-2000, Loudeye Technologies. Archive.org, 2 pages.
Marrin et al., "Steerable Media: Interactive Television via Video Synthesis," Feb. 19-22, 2001, ACM, 10 pages.
Packham et al., "Transport of Context-Based Information in Digital Audio Data," Sep. 22-25, 2000, AES 109th Convention, 14 pages.
Papadakis et al., "Technical Note Design and Architectural of a Digital Music Library on the Web," Jan. 2001, The New Review of Hypermedia and Multimedia, 12 pages.
Vilain et al., "Use Cases and Scenarios in the Conceptual Design of Web Applications," Feb. 2000, PUC-Rio Inf. MCC Dec. 2000, 12 pages.
Zerod, Richard, "The Evolution: From Car Audio to Digital Mobile Multimedia," Feb. 24-27, 1997, SAE Technical Paper Series—1997 International Congress & Exposition, 9 pages.
Letter Agreement addressed to Music Choice Europe Limited, dated Sep. 26, 2000, 8 pages.
Defendants Stingray Digital Group Inc.'s and Stingray Music USA, Inc.'s ("Stingray") Invalidity Contentions Pursuant to Patent L.R. 3-3, Nov. 28, 2016, 25 pages.

(56) References Cited

OTHER PUBLICATIONS

Appendix A to Stingray's Invalidity Contentions, dated Nov. 28, 2016, 245 pages.
Appendix C to Stingray's Invalidity Contentions, dated Nov. 28, 2016, 770 pages.
Appendix E to Stingray's Invalidity Contentions, dated Nov. 28, 2016, 968 pages.
Portions of the File history of U.S. Appl. No. 14/167,509, (Jul. 2014-Jan. 2015), 28 pages.
Portions of the File history of U.S. Appl. No. 14/947,017, (Apr. 2016-Oct. 2016), 32 pages.
Final Written Decision in IPR2017-00888 dated Sep. 20, 2018, 35 pages.
Final Written Decision in IPR2017-01191 dated Oct. 11, 2018, 52 pages.
Final Written Decision in IPR2017-01450 dated Oct. 24, 2018, 47 pages.
Final Office action in U.S. Appl. No. 15/670,613, dated Sep. 7 2018, 18 pages.
Non-Final Office Action issued in U.S. Appl. No. 15/485,417 dated Dec. 14, 2018, 14 pages.
Final Office Action issued in U.S. Appl. No. 15/485,417 dated Apr. 2, 2020 16 pages.
Final Office Action issued in U.S. Appl. No. 15/485,417 dated Apr. 18, 2019, 10 pages.
Non-Final Office Action issued in U.S. Appl. No. 15/485,417 dated Sep. 16, 2019, 11 pages.

* cited by examiner

300

| Ch | 7:00 | 8:00 | 9:00 |
|---|---|---|---|
| 3 ABC | Program desc | | Program descr. |
| 4 CBS | Program descr. | Program descr. | |
| 5 NBC | Program descr. | Program descr. | Program descr. |

. . .

| | |
|---|---|
| 1001 mc | Pop hitlist – video |
| 1002 mc | Indie rock - video |
| 1003 mc | Light Classical - audio |

SYSTEM FOR PROVIDING MUSIC CONTENT TO A USER

CROSS-REFERENCE TO RELATED APPLICATIONS

This application is a continuation of U.S. application Ser. No. 16/281,804, filed on Feb. 21, 2019 (status pending), which is a continuation of U.S. application Ser. No. 15/677, 236, filed on Aug. 15, 2017 (now U.S. Pat. No. 10,219,027, issued on Feb. 26, 2019), which is a continuation of U.S. application Ser. No. 15/616,564, filed on Jun. 7, 2017 (status abandoned), which is a continuation of U.S. application Ser. No. 14/922,597, filed on Oct. 26, 2015 (status abandoned), which claims the benefit of U.S. provisional application No. 62/068,374, filed on Oct. 24, 2014. The above identified applications and patents are incorporated by reference.

TECHNICAL FIELD

Aspects of this disclosure relate to a system for providing content (such as, but not limited to, music) to a user.

BACKGROUND

Users who enjoy watching music videos and/or listening to music (or other content) may subscribe to a television service operated by a television operator (e.g., cable TV operator) that provides access to such content. Such a television service may give the user the ability to listen to a variety of content (e.g., a variety of genres of music and/or a variety of genres of music videos). As one non-limiting example, the television service may include a number of linear channels dedicated to music programming from one or more content providers. The television service may also provide a video on demand service.

SUMMARY

What is desired is an enhanced TV system that enables the user to easily navigate among the various different linear channels and video on demand (VOD) assets. Embodiments of such an enhanced TV system are described herein. While the embodiments are described with reference to music content, this was done solely for the sake of illustration as the enhanced TV system is applicable to any type of content, not just music content.

BRIEF DESCRIPTION OF THE DRAWINGS

The accompanying drawings, which are incorporated herein and form part of the specification, illustrate various embodiments.

FIGS. 3-12 illustrate user interface screens, according to some embodiments, that are provided by the application.

DETAILED DESCRIPTION

Figure 1A:
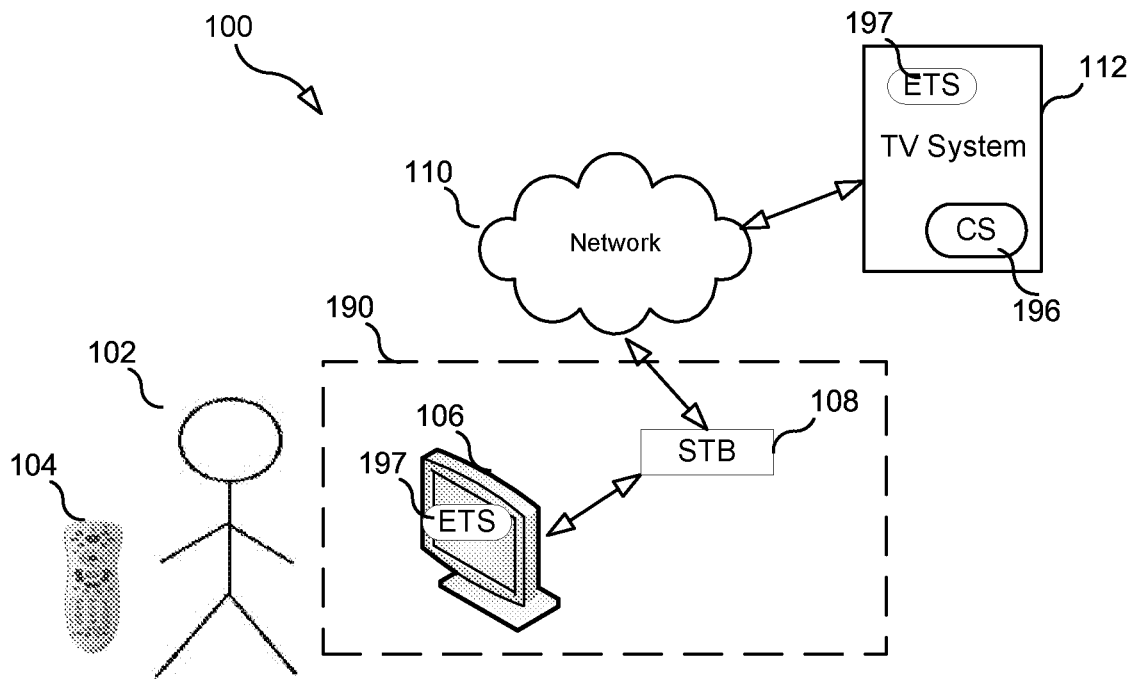
FIG. 1A illustrates a system according to some embodiments.

FIG. 1A illustrates a system 100 according to some embodiments. As shown in FIG. 1A, a user 102 may employ a user device 190 to access a television system 112 via a network 110. In this example, the user device 190 consists of a television (TV) 106 and a set-top box (STB) 108 (e.g., a device comprising a computer system having one or more processors, networking capabilities, and a user input detector for receiving commands from user 102), which is connected to network 110 (e.g., a cable TV network or other network) to which television system 112 is also connected (directly or indirectly). In some embodiments, user device may consist only of TV 106, in which case TV 106 may be a smart-TV comprising networking capabilities (e.g., receiver, transmitter), a computer system having one or more processors, and a user input detector (e.g., a receiver for receiving signals transmitted by a remote control 104). In some embodiments, television system 112 includes hardware and software found at a typical cable-TV head-end system, such as a computer system and networking capabilities. That is, for example, television system 112, in some embodiments, includes one or more content servers (CSs) 196 (e.g., a VOD server or other media server) for providing, among other things, a VOD service to user 102 and a broadcast transmission system for transmitting a multitude of linear television channels as is known in the art. In other embodiments, TV system 112 can be implemented using a merely set of one or more servers (e.g., HTTP servers). TV system 112 may be a distributed computer system or all of its components may be co-located. While CS 196 is shown in FIG. 1A as being a component of the TV system 112, this is not a requirement as CS 196 may be a component separate from TV system 112.

In some embodiments, television system 112 and/or user device 190 is/are operable to enable user 102 to interact with an enhanced TV service (ETS) 197 that allows the user to easily navigate among various different programmed linear channels (a.k.a., "streaming channels") and video on demand (VOD) services. As shown in FIG. 1A, the ETS 197 may be hosted in television system 112, in user device 190 (e.g., in STB 108 and/or TV 106), or in a combination of the two. For example, the ETS 197 may be a computer program and a portion of the computer program (e.g., a server portion) may run on processor(s) within television system 112 and another portion (e.g., a client portion) may run on processor(s) within user device 190.

Figure 1B:
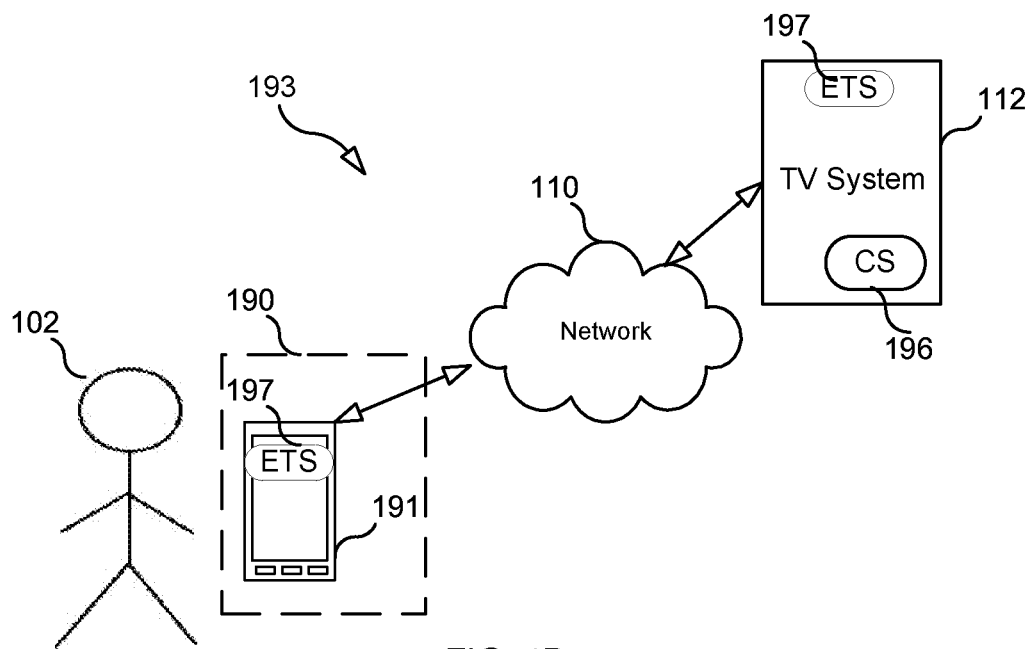
FIG. 1B illustrates a system according to some other embodiments.

FIG. 1B illustrates a system 193 according to other embodiments. In this embodiment, user device 190 is in the form of a communication device 191 (e.g., a personal computer, a smartphone, a tablet, a phablet, a smart TV, internet TV, etc.) comprising networking capabilities (e.g., receiver, transmitter) that enable device 191 to communicate with television system 112 via network 110, a computer system comprising one or more processors, and a user input detector (e.g., a touch screen, keyboard, etc). In some embodiments, television system 112 and/or device 191 is/are operable to enable user 102 to interact with the ETS 197 as described above in connection with system 100. In this embodiment, the ETS may be hosted in television system 112, in user device 190 or in a combination of the two. For example, the ETS 197 may be a computer program and a portion of the computer program (e.g., a server portion) may run on processor(s) within television system 112 and another portion (e.g., a client portion) may run on processor(s) within user device 190.

Figure 2:
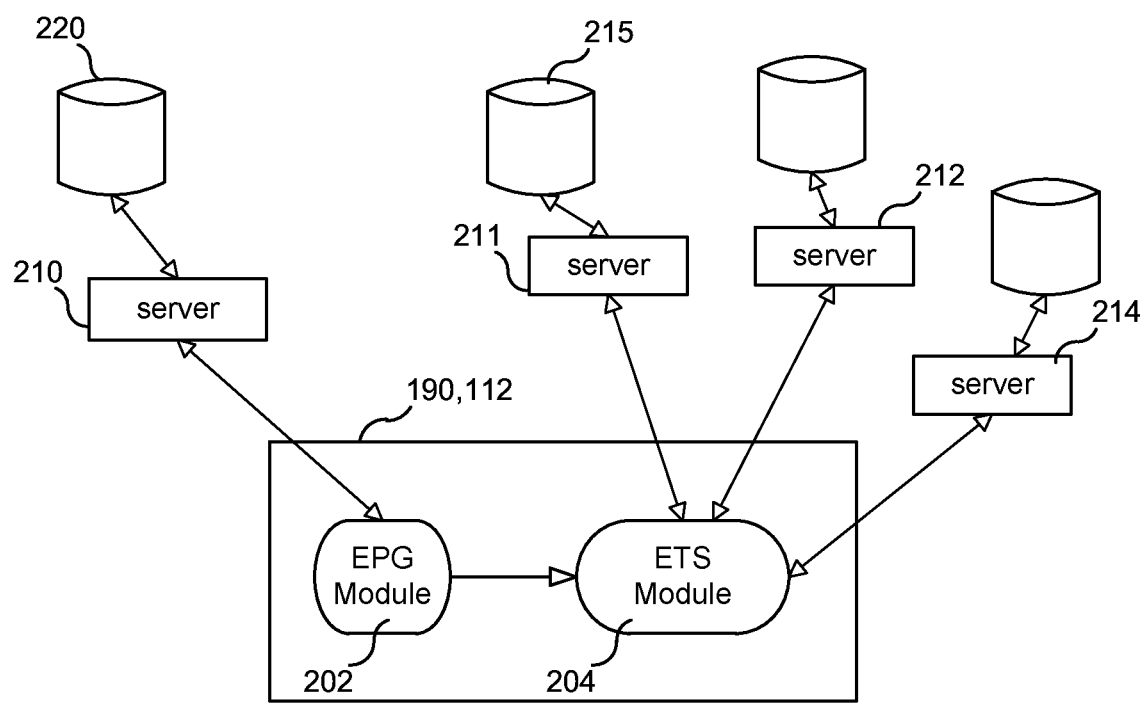
FIG. 2 is a functional block diagram of a user device according to some embodiments.

FIG. 2 illustrates a functional block diagram of user device 190 and/or TV system 112 according to some embodiments. In the embodiment shown, the user device 190 and/or TV system 112 includes an electronic program guide (EPG) module 202 and an ETS module 204 of ETS 197.

In some embodiments, EPG module 202 functions to obtain EPG information from and EPG information server 210 by, for example, transmitting a request message to server 210. In response to such a request message, server 210 may obtain from a database 220 EPG information. In some embodiments, for each linear program channel (a.k.a., linear TV channel or streaming channel) that user 102 may access, the EPG information includes a set of one or more time slot records, where each time slot record in the set includes information identifying a time slot (e.g., a beginning time and an end time) and program information corresponding to the program occurring on the linear channel in that time slot (e.g., a program description). In some embodiments, the set of time slot records for streaming audio and video channels may only consist of a single time slot record.

In some embodiments, a time slot record may also include information for retrieving an object stored at (or generated by) a remote server. For example, the object may be an HTML document and the information for retrieving the HTML document may be a Uniform Resource Identifier (URI) (e.g., a Uniform Resource Locator (URL)). For example, a time slot record for one of the streaming video channels (or one of the streaming audio channels) may include not only information identifying the format of the music that is played on the streaming channel but also a URI for obtaining from a server an object (e.g., HTML document) corresponding to the streaming channel.

The EPG module 202 further functions to display at least some of the EPG information it receives from server 210. EPG module 202 may, before it displays the EPG information, process the information (e.g., format the information). FIG. 3 illustrates an example of EPG information 300 as displayed by EPG module 202 on a display device of user device 190. As shown in FIG. 3, EPG module 202 can provide information to user 102 as to the content that is currently available on each linear channel (as well as content recently shown on each linear channel). As further shown in FIG. 3, at least some of the linear channels are linear "music" channels (i.e., channels 1001, 1002, and 1003). A linear music channel may be a streaming audio channel or a streaming video channel, as is known in the art. As is also known in the art, EPG module 202 can allow user 102 to select for viewing/listening any one of the displayed channels in list 300.

In some embodiments, in response to user 102 selecting one of the streaming audio channels or streaming video channels via the EPG module 202, the EPG module 202 launches the ETS module 204 and provides to the ETS module information indicating that the user 102 desires to consume (e.g., watch or listen) the selected streaming channel. The ETS module 204 then tunes to the selected streaming channel so that the user can see/hear the content (e.g., music or other content) that is currently being transmitted on the streaming channel and displays a user interface to the user (see e.g., user interface 400 in FIG. 4).

For example, in some embodiments, when user 102 selects a particular streaming channel via the EPG module 202, EPG module 202 provides to ETS module 204 (which may be a conventional web browser) the URI included in the current time slot record for the selected streaming music channel (i.e., the time slot record that identifies a time slot that includes the present time). In response to receiving the URI from EPG module 202, ETS module 204 obtains the object identified by the URI. For example, ETS module 204 may send to a remote HTTP server 211 an HTTP request comprising the URI and, in response, receives from server 211 the identified object. The object (e.g., HTML document) causes ETS module 204 to display a user interface screen (see e.g., the user interface shown in FIG. 4) corresponding to the selected music channel. For example, in some embodiments, the object may include URIs that point to additional objects (e.g., images, scripts, videos, JSONobjects, XML files, manifest files for streaming content, flash objects, etc.) hosted by other servers (e.g. servers 212 and 214) and ETS module 204 obtains these additional objects and uses these additional objects in generating the user interface screen.

Figure 4:
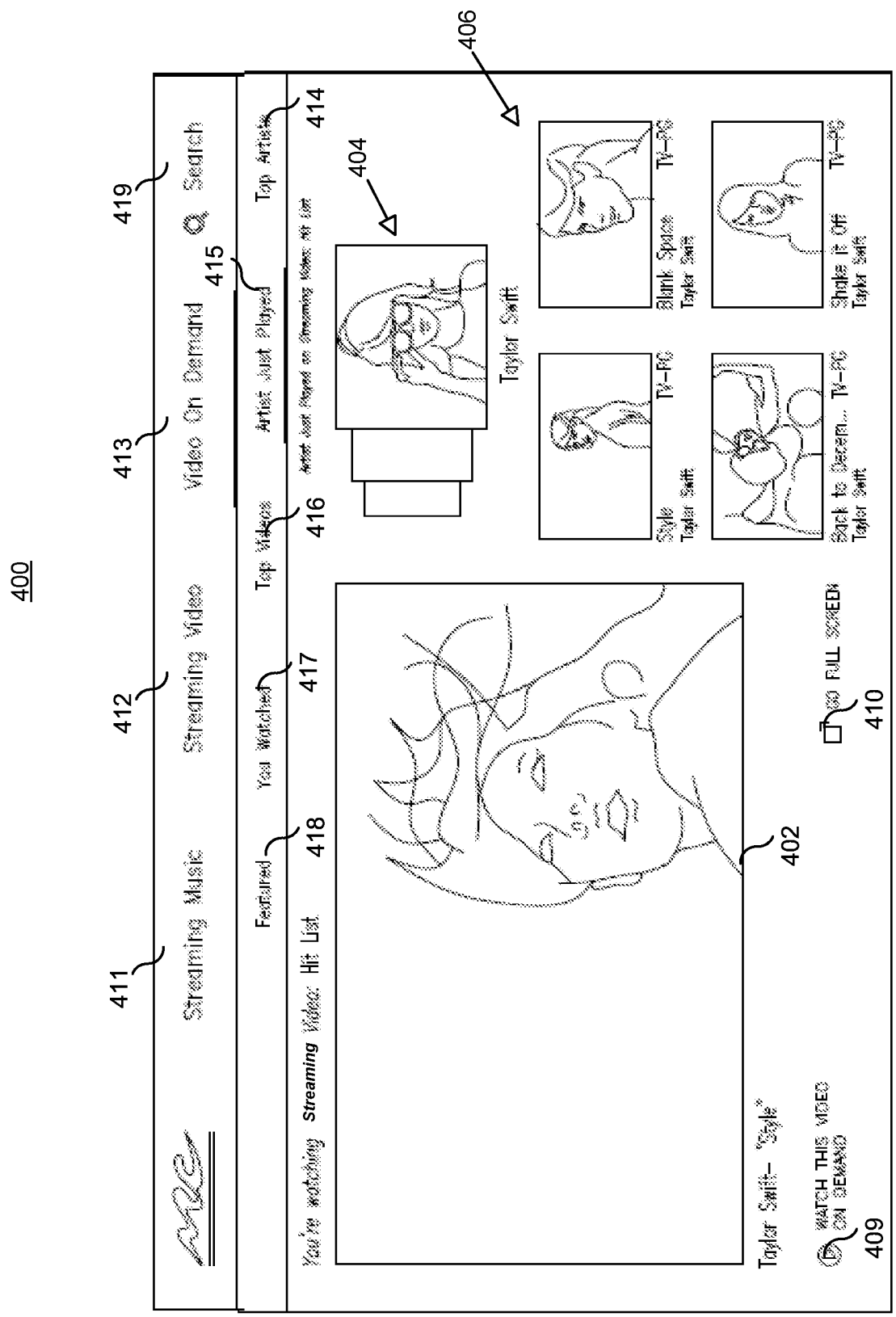

Referring now to FIG. 4, FIG. 4 illustrates an example user interface screen 400 generated by the ETS module 204 as a result of the user selecting to watch the Hit List streaming video channel (e.g., as a result of module 204 processing the object associated with the Hit List music streaming video channel—e.g., the object identified in the current time slot record for the Hit List streaming video channel).

Screen 400 includes a channel area 402 (a.k.a., a display area) in which the ETS module displays to the user the video content that is currently being transmitted on the selected streaming video channel (in this case the MC Hit List streaming video channel). User 102 is given the option to expand channel area 402 so that it takes up the entire display screen of the user device by selecting a "go full screen" activatable user interface element 410 (hereafter "button").

User interface screen 400 also includes an artist list 404 and a video content list 406 listing video content related to an artist selected from the list 404. ETS module 204 enables user 102 to select an artist from list 404. In this particular example, the artist list 404 is in the form of an artist carousel, but the invention is not limited to using a carousel to provide a list, as other techniques can be used, such as a menu (drop down, pop-up, etc.) or other interface element for providing choices to a user. In the example shown, artist carousel 404 comprises a set of pictures (e.g., thumbnail photographs), where each picture identifies an artist (e.g., each picture contains a still or moving image of an artist or otherwise identifies the artist). In the embodiment shown, at any given time, at most only one of the pictures in the set is not obscured and the other pictures are either fully or partially obscured. The artist that is shown in the picture that is not obscured is referred to as the "selected artist."

When screen 400 is first displayed to user 102, the selected artist will be the artist associated with the content that is currently being transmitted on the selected video channel. In this case, a Taylor Swift music video is currently being transmitted over the Hit List channel. Thus, the selected artist in carousel 404 is Taylor Swift. The user 101 can change the selected artist. For example, the user can change which picture in the carousel 404 will be the unobscured picture by, for example, putting the input focus on the carousel 404 and then pressing a certain button on a remote control 104 (or other input device), thereby changing the selected artist. In some embodiments, the artists that are included in artist list are the artists whose videos played just prior to the current video. Thus, if a video from Ariana Grande played just before the currently playing Taylor Swift video, then the artist in the carousel directly underneath Taylor Swift would be Ariana Grande.

In some embodiments, video content list 406 is a list of video content (e.g., music videos) related to whoever is the selected artist. Thus, when the selected artist is changed, list 406 will also change as list 406 display a list of videos related to the selected artist. User 102 can select to watch on demand any of the videos included in list 406.

As shown in the example, the list of video content 406 is presented to the user using a set of pictures, where each picture represents a different video. User 102 can select any of the listed videos to watch on demand. For example, with respect to system 100, user 102 can use remote control device 104 to communicate commands to the ETS 197 to cause the ETS to put the input focus on one of the pictures (e.g., highlight one of the pictures), and then, after the desired picture is highlighted, user 102 can send a "watch" command to the ETS (e.g., user can press a certain button on remote control 104, such as a button labeled "ok" or "select"). In response to receiving the "watch" command, the ETS will initiate a VOD session for the video identified by the selected picture. For example, the ETS may cause user device 190 to transmit to content server 196 (e.g., a VOD server) a video request identifying the selected video, and the server 196 responds to the request by streaming or otherwise providing the requested video to user device 190, which will play the video for user 102. In some embodiments, server 196 streams (or otherwise provides) the requested video to user device 190 by providing to the user device 190 one or more playlist files (e.g., manifest files) that enable the ETS to obtain audio/video data corresponding to the content being transmitted on the channel (e.g., the playlist file identifies a segment of video data corresponding to the video and the ETS upon receiving the playlist file sends a request to a content server for the video segment, and upon receiving the segment of video data the ETS renders the video data in display area 402). In addition to selecting a video from list 406, user 102 can select to watch on demand the video that is currently playing on the linear channel by selecting button 409.

Screen 400 may also include other buttons. For example, screen 400 may include a "Streaming Music" button 411, a "Streaming Video" button 412, and a "Video on Demand" button 413, a "Top Artists" button 414, a "Artist Just Played" button 415, a "Top Videos" button 416, a "You Watched" button 417, "Featured" button 418, and a "Search" button 419.

Figure 5:
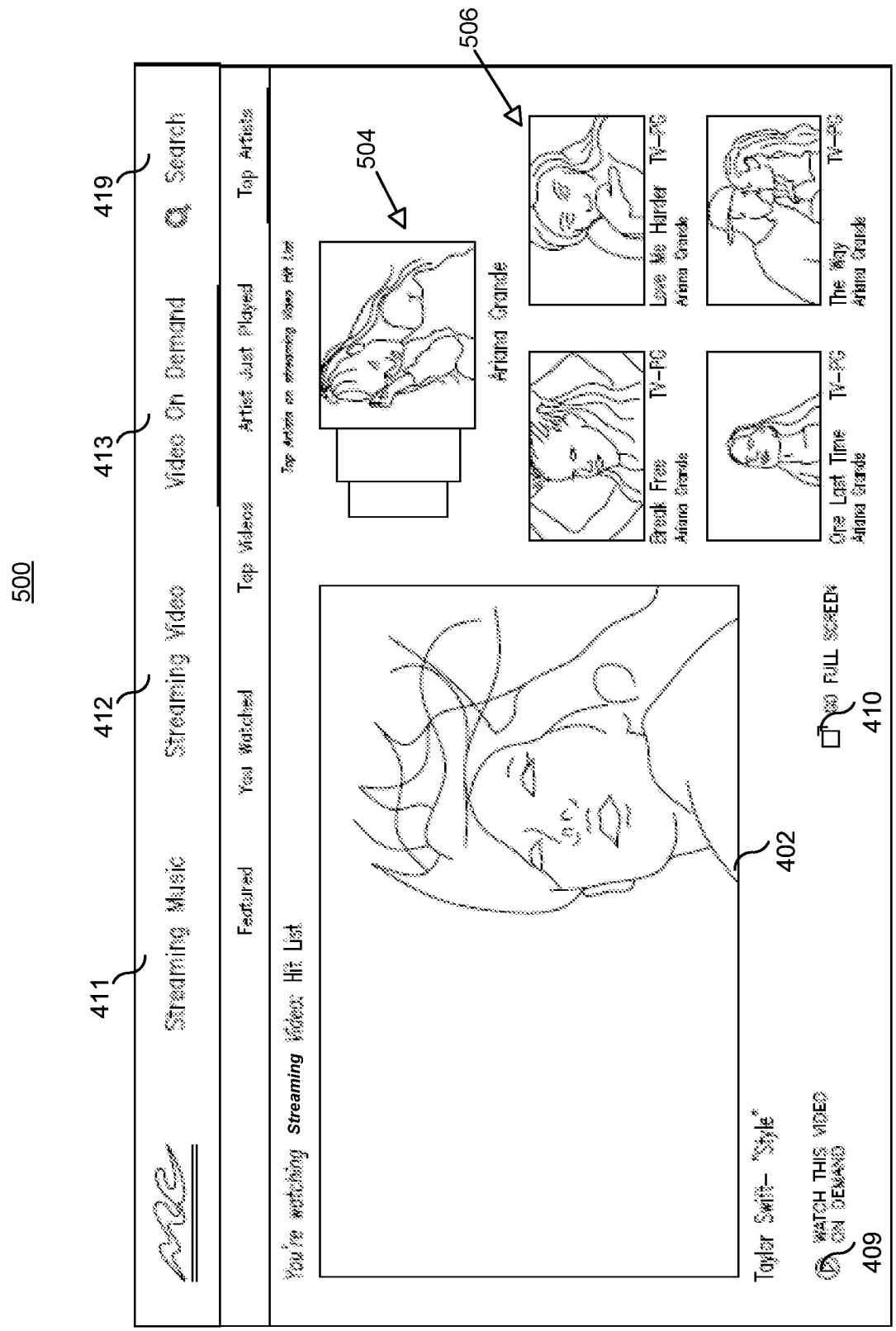

FIG. 5 illustrates a user interface screen 500 that may be displayed when user 102 selects the "Top Artists" button 414 from screen 400. Screen 500 is similar to screen 400 in that screen 500 includes channel area 402 and buttons 409-419. Additionally, screen 500 includes an artist list 504 in the form of an artist carousel and a video content list 506 listing related video content. Artist carousel 504 enables user 102 to select an artist. In the example shown, carousel 504 comprises a set of pictures, where each picture identifies an artist. In the embodiment shown, at any given time, at most only one of the pictures in the set is not obscured and the other pictures are either fully or partially obscured. As described above, the artist that is shown in the picture that is not obscured is referred to as the "selected artist."

When screen 500 is first displayed to user 102 in response to user 102 activating the "Top Artists" button, the selected artist will be the artist designated as the current "top artist" within a particular category of music (e.g., within the category of music associated with the channel playing at the time the button was selected). In this case, Ariane Grande has been designated as the top artist within the "Hit List" music category. The user can change which picture in the carousel 504 will be the unobscured picture by, for example, putting the input focus on the carousel 504 and then pressing a certain button on a remote control 104 or other input device, thereby changing the selected artist. In some embodiments, the artists that are included in artist list 504 are only artists who have been designated as top artists within the music category (e.g. the artist within the category having the greatest number of video plays within a certain period of time, such as one week).

Like video content list 406, video content list 506 is a list of video content (e.g., music videos) related to whoever is the selected artist in carousel 504. Thus, when the selected artist is changed, list 506 will also change as list 506 displays a list of videos related to the selected artist. User 102 can select to watch on demand any of the videos included in list 506. As shown, the list of video content 506 is presented to the user using a set of pictures, where each picture represents a different video.

Figure 6:
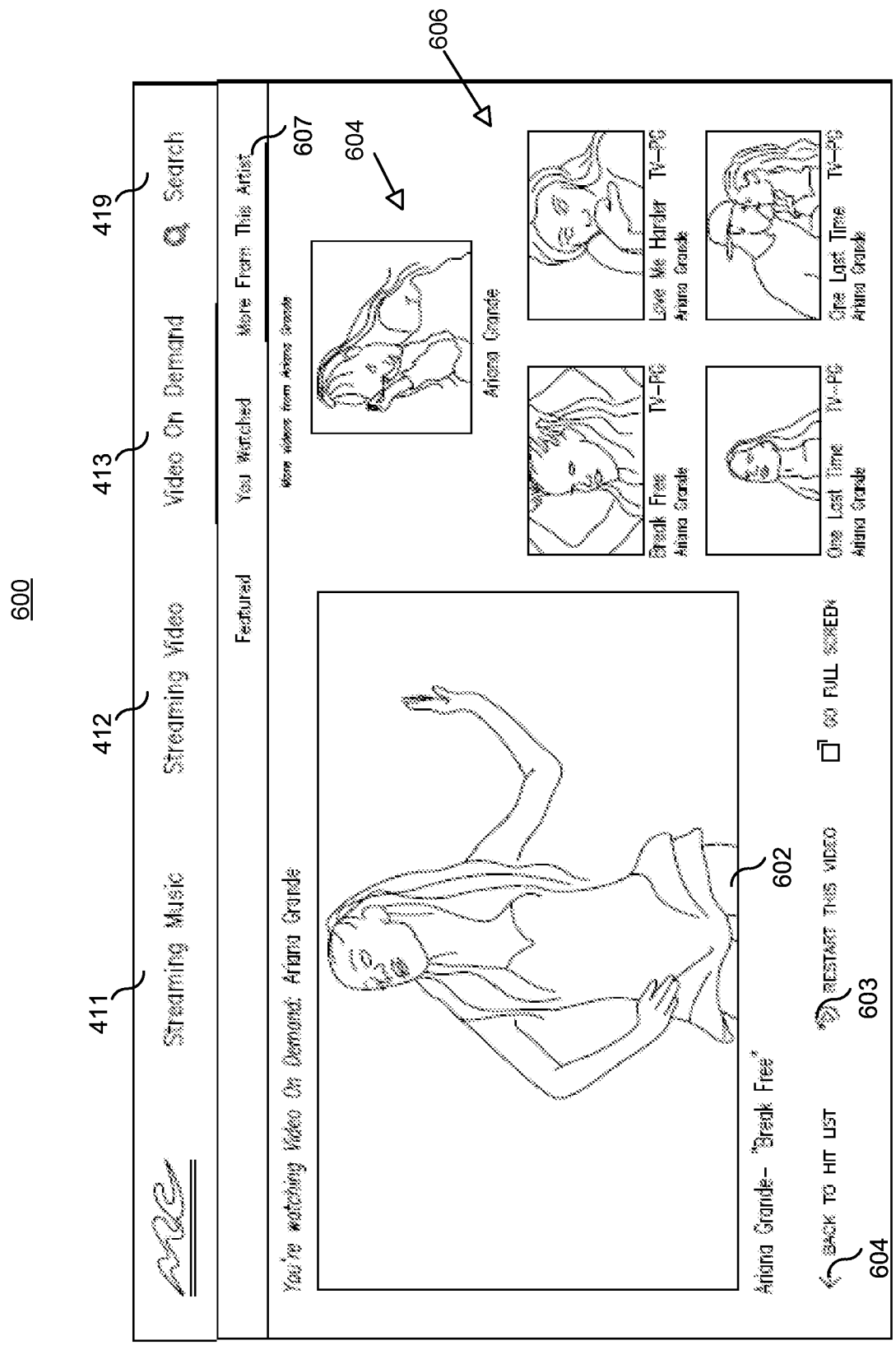

FIG. 6 illustrates a user interface screen 600 that may be displayed when user 102 selects to watch a video on demand (e.g., selects a video from a video list, such as list 406 or 506). In this example, user 102 has selected an Ariana Grande video from list 506.

Screen 600 includes a video display area 602 in which the ETS displays to the user the video selected by the user. User 102 is given the option to expand display area 602 so that it takes up the entire display screen of the user device by selecting a "go full screen" button 410.

Screen 600 includes a portion 604 for displaying information related to the artist performing in the selected video (e.g., in this case a picture of the artist). Screen 600 also includes a video content list 606 listing other videos by the selected artist. User 102 can select to watch on demand any of the videos included in list 606.

In addition to including buttons 410-419, screen 600 also includes a "Restart" button 603, a "Back" button 604, and a "More From This Artist" button 606. Activating Restart button 603 causes the ETS to replay the current video from its beginning. Activating Back button 604 will cause the ETS to play the streaming channel that was last played. For example, in this case the Hit List streaming video channel was the last played streaming channel; thus activating button 604 will cause the ETS to display screen 400. Activating button 606 causes the ETS to display on screen 600 additional videos by artist of the currently playing video (Ariana Grande in this example).

Figure 7:
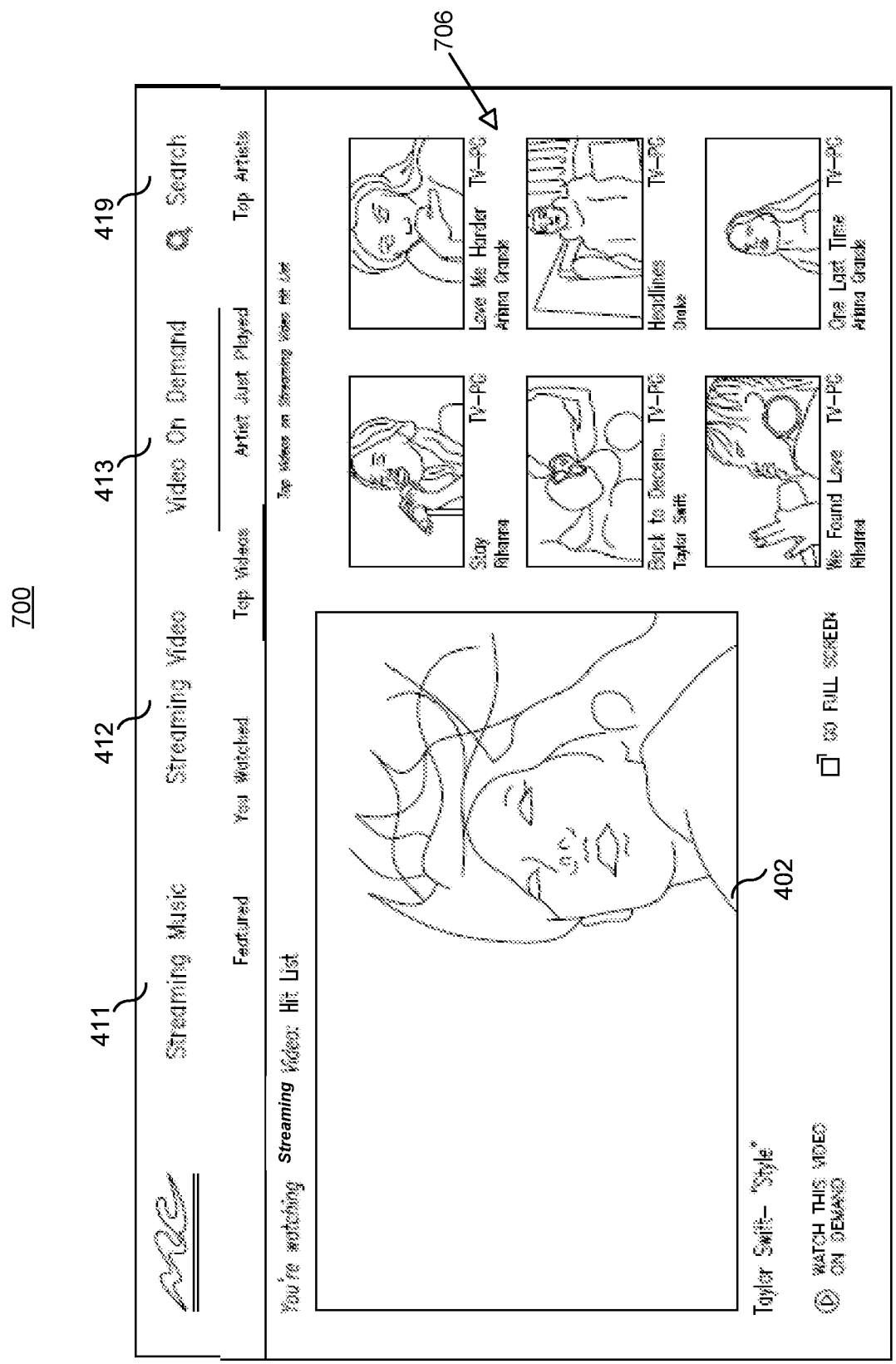

FIG. 7 illustrates a user interface screen 700 that may be displayed when user 102 selects "Top Videos" button 416 from screen 400. Screen 700 has many of the same elements as screen 400 but does not include the artist carousel 404. Instead, screen 700 includes a video content list 706 listing a set of videos. The listed videos are the top played videos within the music category of the currently playing streaming channel (i.e., Hit List in this example). User 102 can select to watch on demand any of the videos included in list 706.

Figure 8:
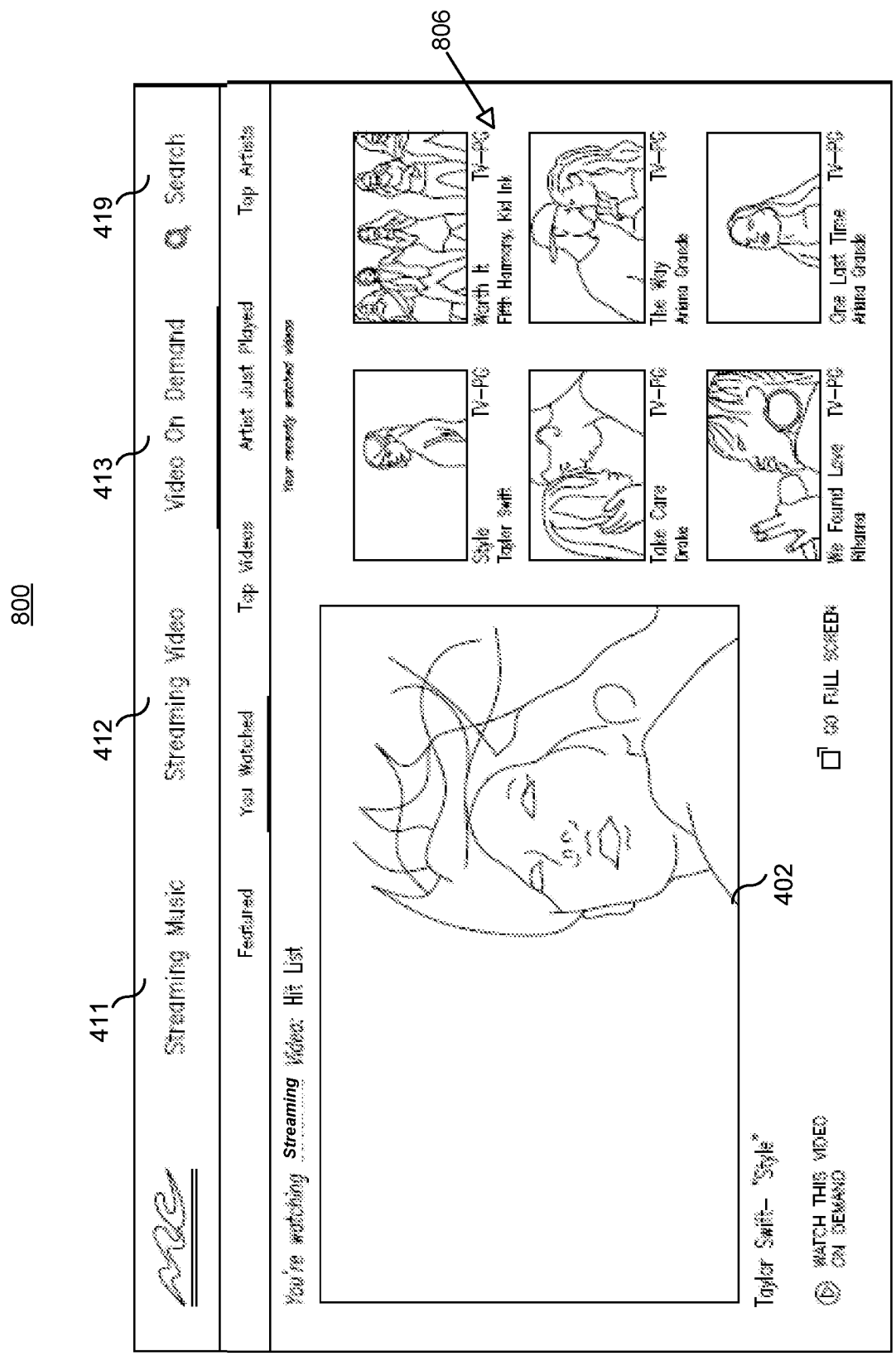

FIG. 8 illustrates a user interface screen 800 that may be displayed when user 102 selects "You Watched" button 417 from screen 400. Screen 800 has many of the same elements as screen 400 but does not include the artist carousel 404. Instead, screen 800 includes a video content list 806 listing a set of videos. The listed videos are the most recent videos that user 102 has watched. User 102 can select to watch on demand any of the videos included in list 806.

Figure 9:
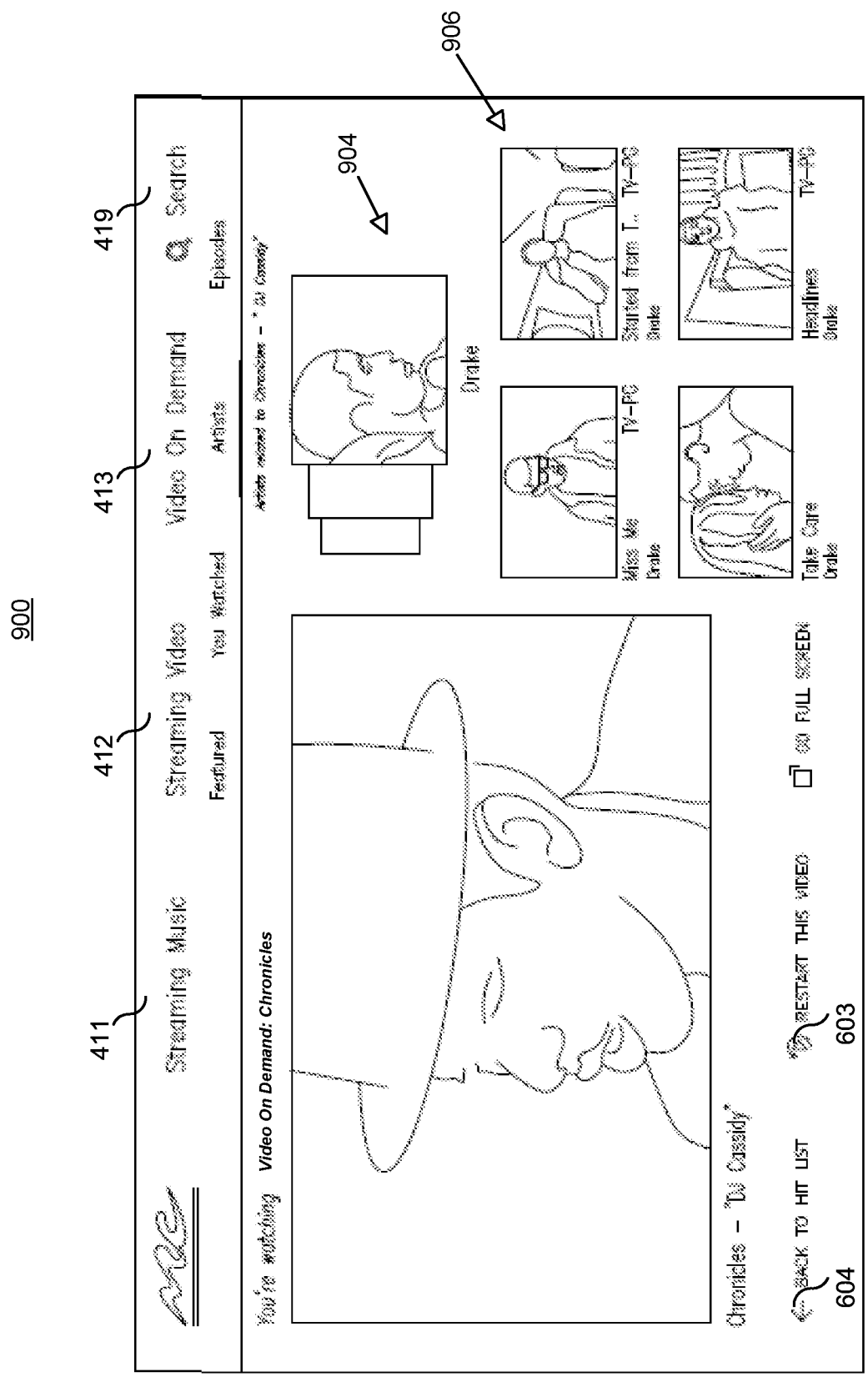

FIG. 9 illustrates a user interface screen 900 that may be displayed when user 102 selects "Featured" button 418 from screen 400. Screen 900 is similar to screen 600. For example, screen 900 includes video display area 602 in which the ETS displays to the user a selected video. A difference between screen 900 and screen 600 is that the video that plays in video display area 602 on screen 600 is a user selected video, whereas the video that plays in video display 602 on screen 900 is a system selected video (a.k.a., "the featured video"). In this example, the featured video is an episode of a show named "Chronicles." Also, unlike screen 600, screen 900 includes an artist carousel 904.

Artist carousel 904 is just like carousels 404 and 504 (i.e., carousel 904 enables user 102 to select an artist in the manner described above with reference to carousel 404). The artists listed in artist carousel 904 are the artists who are featured or mentioned in the video that is playing in display area 602. In this example, Drake was one of the artists featured in the Chronicles episode that is playing in area 602. Screen 900 also include a video content list 906, which is a list of video content (e.g., music videos) related to whoever is the selected artist in carousel 904. User 102 can select to watch on demand any of the videos included in list 906.

Figure 10:
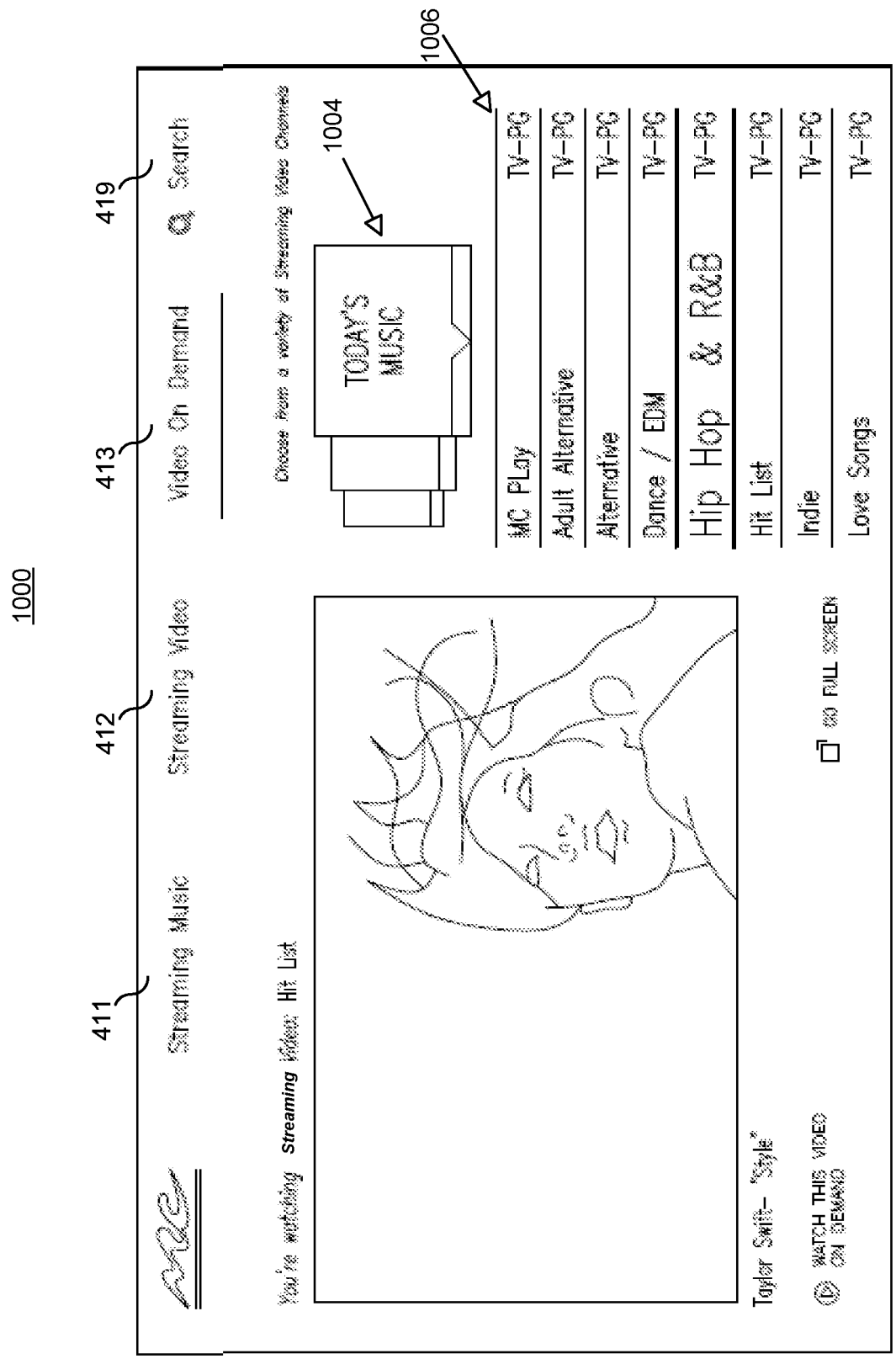

FIG. 10 illustrates a user interface screen 1000 that may be displayed when user 102 selects "Streaming Videos" button 412 from screen 400. Screen 1000 is similar to screen 400. For example, screen 1000 includes channel area 402 in which the ETS displays to the user the video content that is currently being transmitted on the selected streaming video channel (in this case the MC Hit List streaming video channel).

A difference between screen 1000 and screen 400 is that the artist carousel 404 is replaced with a channel group carousel for enabling user 102 to select a channel group (e.g., "Today's Music") and video list 406 is replaced with streaming channel list 1006 listing the streaming channels that are included in selected channel group. User 102 can select a channel group in carousel 1004 in the same manner the user selects an artist in carousel 404. When user 102 selects a new channel group, the streaming channels displayed in list 1006 will change such that only those streaming channels included in the selected channel group are displayed. When user 102 selects a streaming video channel from list 1006 (e.g., when a user clicks on a channel or highlights a channel from the list and presses an "ok" button), screen 400 is displayed and the ETS will play in channel area 402 the video content that is currently being transmitted on the selected streaming video channel. That is, selecting a streaming channel from list 1006 has the same effect as selecting a streaming channel via the EPG.

Figure 11:
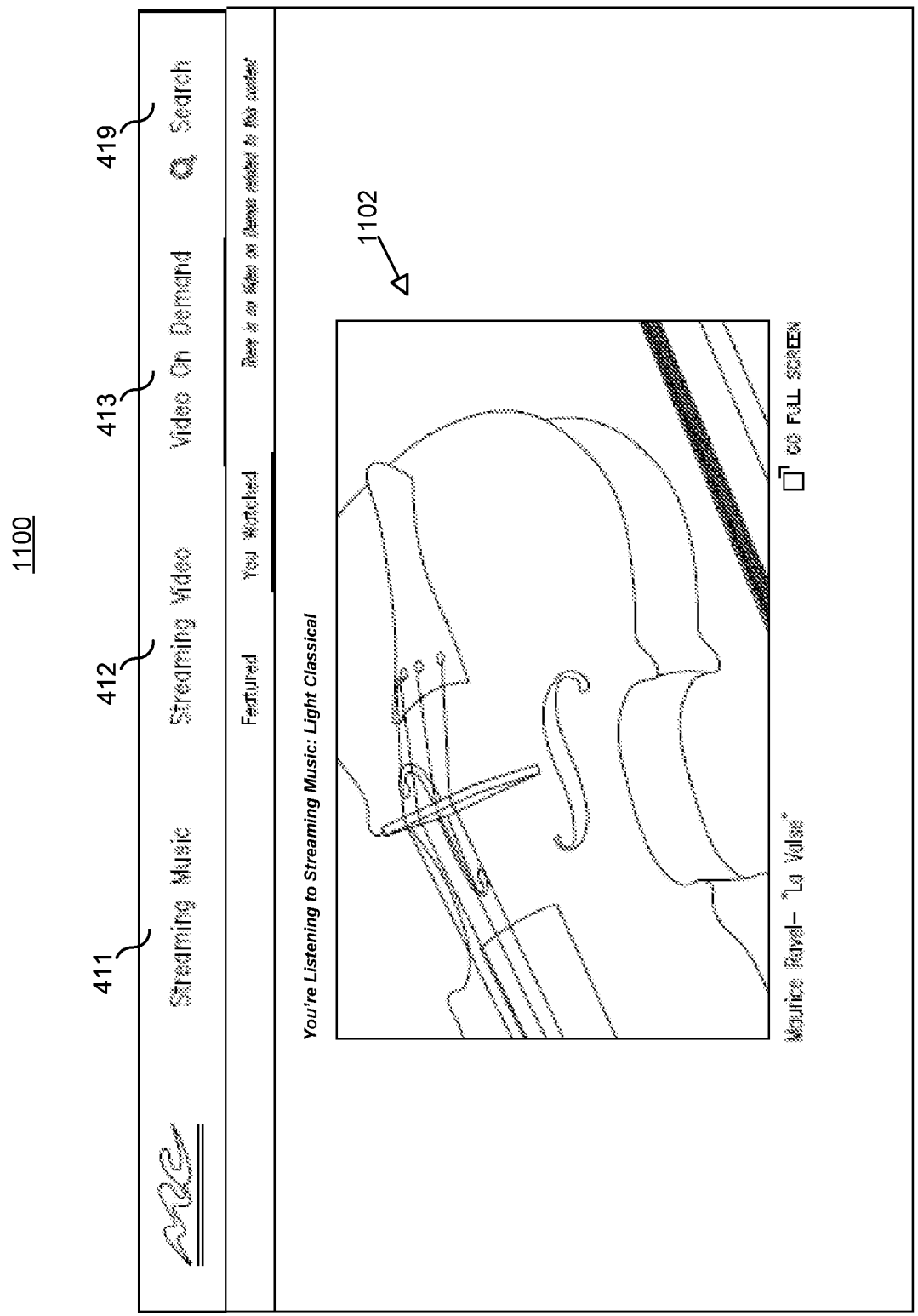

FIG. 11 illustrates a user interface screen 1100 that may be displayed when user 102 selects to listen to a streaming audio channel. User 102 may select a streaming audio channel from either list 1006 or via the EPG module 202 as described above. Screen 1100 includes a content display area 1102 for displaying content (e.g., images, artist trivia, etc.) associated with the music content that is currently playing on the selected streaming audio channel. In the example shown, there are no videos related to the music content that is currently playing on the selected streaming audio channel (e.g., there are no videos related to the artist of the music content). Accordingly, screen 1100 does not include a video selection list. If one or more videos were related to the music content, then screen 1100 would include a video selection list containing the videos, like lists 406, 506.

Figure 12:
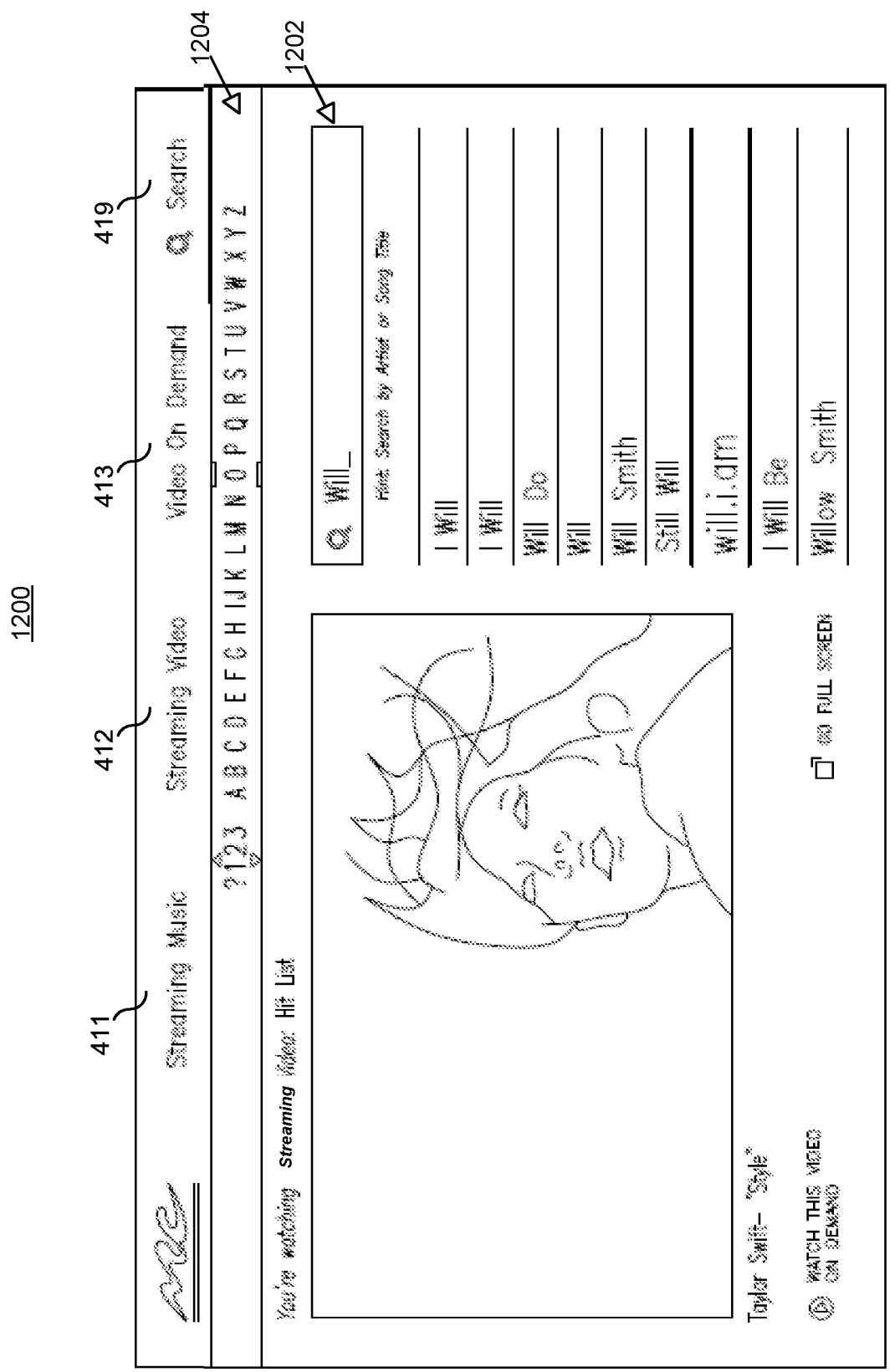

FIG. 12 illustrates a user interface screen 1200 that may be displayed when user 102 selects "Search" button 419 from screen 400. Screen 1200 includes a text input box 1202 into which a user can input a search query (i.e., a string of characters). In embodiment shown, user 102 inputs the search query by selecting characters (e.g., letters, numbers, etc.) from a character bar 1204 that displays, among other things, the English alphabet. When a character is selected, the character is appended to the search query shown in input box 1202. The ETS may be configured to perform a dynamic search. That is, as characters are added to the search query, ETS performs a search using the search query and displays matching results underneath box 1202. The results of the search can include the names of music videos as well as artist names. In the example, shown, the artist name "will.i.am" is one of the search results that matches the search query "Will" and the user has highlighted this search result. If the user selects the "will.i.am" search result (e.g., highlights the search result and then presses an "OK" button on remote control 104 or other input device), then the ETS may display a list of music videos related to the selected artist. For example, screen 700 may be displayed where list 706 includes only videos related to the selected artist.

As discussed above, when user 102 activates a button on one of the user interface screens described above, the ETS typically changes the user interface in response. More specifically, in some embodiments, user activation of a such a button causes ETS module 204 to transmit to a server (e.g. server 211, 212 or 214) a message comprising information associated with the selected button (e.g., a button identifier). The message may also contain information identifying the streaming channel to which the ETS is tuned. In response to receiving this message, the server may use information in the message to retrieve from a database (e.g., database 215) information related to the activated button (e.g., a list of the videos the user 102 recently watched). The server then provides this information to the ETS module 204, which may then display the information and/or use the information to obtain further objects (e.g., images) to display.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

The invention claimed is:

1. A method for providing an enhanced service to a user of a user device in communication with a server system, the method comprising:
  receiving information indicating that the user desires to consume a selected programmed linear music channel; and
  after receiving the information, displaying on a display device of the user device a user interface screen, wherein the user interface screen comprises:
    i) a first display area for displaying a graphic image associated with music content transmitted by the server system on the selected programmed linear music channel in accordance with a music content schedule for the selected programmed linear music channel,
    ii) a second display area for displaying a set of graphic images;
  displaying, in the first display area, a first graphic image associated with first scheduled music content transmitted by the server system on the selected programmed linear music channel in accordance with the music content schedule for the selected programmed linear music channel;
  while displaying the graphic image in the first display area displaying in the second display area an artist list for enabling the user to select an artist, wherein the artist list comprises a set of at least two artist images including a first artist image and a second artist image, each artist image included in the set identifies an artist;

after the first scheduled music content has ended: 1) automatically displaying, in the first display area, a second graphic image associated with second scheduled music content transmitted by the server system on the selected programmed linear music channel in accordance with the music content schedule for the selected programmed linear music channel and 2) automatically adding to the displayed artist list a third artist image such that the first artist image, the second artist image, and the third artist image are displayed at the same time in the second display area;

while displaying the second graphic image in the first display area and the second set of graphic images in the second display area, receiving a user input indicating that the user has selected one of the graphic images included in the second set of graphic images; and after receiving the user input, causing the video associated with the selected graphic image to be streamed on-demand to the user device.

2. The method of claim 1, wherein the first set of artist images includes at least four artist images.

3. The method of claim 2, wherein
the first set of artist images is displayed in the second display area in a grid pattern having at least two rows and two columns.

4. The method of claim 1, wherein
each graphic image included in the first set of graphic images is associated with a different video associated with the artist identified by the first artist image, and
each graphic image included in the second set of graphic images is associated with a different video associated with the artist identified by the third artist image.

5. The method of claim 1, wherein causing the video to be streamed on-demand to the user device comprises:
a) receiving a request transmitted by the user device for a playlist file associated with the video;
b) in response to the request, transmitting the playlist file to the user device, the playlist file identifying a segment of video data corresponding to the video;
c) receiving a request for the segment of video data corresponding to the video; and
d) in response to the request for the segment of video data, transmitting to the user device the segment of video data.

6. A method for providing a service to a user of a user device in communication with a server system, the method comprising:
receiving information indicating that the user desires to consume a selected programmed linear channel; and
after receiving the information, displaying on a display device of the user device a user interface screen, wherein the user interface screen comprises:
i) a first display area for displaying a first graphic image associated with first scheduled content transmitted by the server system on the selected programmed linear channel in accordance with a content schedule for the selected programmed linear channel, and
ii) a second display area for displaying a set of graphic images;
while displaying the first graphic image: 1) displaying in the second display area a first set of graphic images, wherein each graphic image included in the first set of graphic images is associated with a different video and 2) displaying an image carousel for enabling the user to select an image, wherein the image carousel comprises a first image;

after the first schedule content has ended: 1) automatically displaying, in the first display area, a second graphic image associated with second scheduled content transmitted by the server system on the selected programmed linear channel in accordance with the content schedule for the selected programmed linear channel; 2) automatically adding to the displayed carousel a second image; and 3) automatically displaying in the second display area a second set of graphic images, wherein each graphic image included in the second set of graphic images is associated with a different video; and after displaying in the second display area the second set of graphic images and in response to receiving a user input directed to the carousel:
a) displaying the first image so that the first image is not obscured; and
b) replacing, in the second display area, the second set of graphic images with the first set of graphic images such that the first set of graphic images are displayed in the second display area in place of the second set of graphic images.

7. The method of claim 6, wherein the first set of graphic images includes at least two graphic images.

8. The method of claim 7, wherein
the first set of graphic images includes at least four graphic images, and
the first set of graphic images is displayed in the second display area in a grid pattern having at least two rows and two columns.

9. The method of claim 7, wherein each graphic image included in the second set of graphic images is associated with a different video associated with an artist identified by the second image.

10. A user device for providing a service to a user, the user device comprising:
a user input detector for receiving information indicating that the user desires to consume a selected programmed linear channel; and
a computer system comprising one or more processors, wherein the computer system is configured to:
display, on a display device, a user interface screen, wherein the user interface screen comprises:
i) a first display area for displaying a graphic image associated with content transmitted by the server system on the selected programmed linear channel in accordance with a content schedule for the selected programmed linear channel,
ii) a second display area for displaying a set of graphic images;
display, in the first display area, a first graphic image associated with first content transmitted by the server system on the selected programmed linear channel in accordance with a content schedule for the selected programmed linear channel;
while displaying the first graphic image: 1) display in the second display area a first set of graphic images and 2) display an artist list for enabling the user to select an artist, wherein the artist list comprises a first artist image that identifies an artist, and further wherein and each graphic image included in the first set of graphic images is associated with a different video;
after the first content has ended: 1) automatically display, in the first display area, a second graphic image associated with second content transmitted by the server system on the selected programmed linear channel in accordance with a content schedule for the selected programmed linear channel; 2) automatically add to the displayed artist list a second artist image such that the second artist image is not obscured; and 3) automatically display in the second display area a second set of graphic images, wherein each graphic image included in the second set of graphic images is associated with a different video; and after receiving a user input indicating that the user has selected one of the graphic images displayed in the second display area, cause the video associated with the selected graphic image to be streamed on-demand to the user device.

11. The user device of claim 10, wherein
each graphic image included in the first set of graphic images is associated with a different video associated with the artist identified by the first artist image, and
each graphic image included in the second set of graphic images is associated with a different video associated with the artist identified by the second artist image.

12. The user device of claim 10, wherein the user device is configured to cause the video to be streamed to on-demand the user device by performing a process that includes:
  a) the user device transmitting to a content server a request for a playlist file associated with the video;
  b) the user device receiving the playlist file, the playlist file identifying a segment of video data corresponding to the video;
  c) the user device transmitting to a content server a request for the segment of video data corresponding to the video;
  d) the user device receiving the segment of video data; and
  e) the user device rendering the segment video data in the first display area.

13. A server system for providing an enhanced service to a user, the server system comprising:
  a receiver for receiving information indicating that the user desires to consume a selected programmed linear channel; and
  a computer system comprising one or more processors, wherein the computer system is configured to:
  cause a user device to display, on a display device, a user interface screen, wherein the user interface screen comprises:
    i) a first display area displaying a first graphic image associated with first content transmitted by the server system on the selected programmed linear channel in accordance with a content schedule for the selected programmed linear channel,
    ii) a second display area for displaying a set of graphic images;
  cause the user device to display in the second display area while the first graphic image is displayed in the first display area a first set of graphic images, wherein each graphic image included in the first set of graphic images is associated with a different video;
  cause the user device to display a list while the first graphic image is displayed in the first display area, wherein the list comprises a first image;
  after the first content has ended: 1) automatically cause the user device to display, in the first display area, a second graphic image associated with second content transmitted by the server system on the selected programmed linear channel in accordance with a content schedule for the selected programmed linear channel; 2) automatically cause the user device to add to the displayed list a second image; and 3) automatically cause the user device to display a second set of graphic images, wherein each graphic image included in the second set of graphic images is associated with a different video.

14. The server system of claim 13, wherein
each graphic image included in the first set of graphic images is associated with a different video associated with an artist associated with the first artist image, and
each graphic image included in the second set of graphic images is associated with a different video associated with the artist associated with the second image.

* * * * *